United States Patent [19]
Bufkin et al.

[11] 3,842,677
[45] Oct. 22, 1974

[54] FLUID SAMPLING PROCESS AND APPARATUSES THEREFOR

[75] Inventors: Guydell O. Bufkin; Thomas P. Moore, both of Amarillo, Tex.

[73] Assignee: Pioneer Natural Gas Company, Amarillo, Tex.

[22] Filed: Nov. 15, 1971

[21] Appl. No.: 198,740

[52] U.S. Cl. .......................... 73/421.5 R, 73/422 R
[51] Int. Cl. ............................................ G01n 1/14
[58] Field of Search ....... 73/421 R, 421.5 R, 422 R, 73/422 TC

[56] References Cited
UNITED STATES PATENTS

| | | | |
|---|---|---|---|
| 2,608,866 | 9/1952 | Breedlove | 73/422 R |
| 2,656,725 | 10/1953 | Kestner | 73/422 TC |
| 3,673,871 | 7/1972 | Randle | 73/422 R |

*Primary Examiner*—S. Clement Swisher
*Attorney, Agent, or Firm*—Ely Silverman

[57] ABSTRACT

Processes and apparatuses for automatically sampling gases and/or liquids by the steps of (1) opening a valve passage from (a) a chamber containing an incompressible metering liquid in a first chamber in contact with a first sample of a fluid source at a predetermined initial pressure through a first conduit of fixed internal diameter and length to (b) a second flexible conduit and a second upstanding chamber initially filled with a gas and (2) locating additional volume of said fluid source into said first chamber and passing a fixed portion of a volume of said incompressible metering liquid from said first chamber and said first conduit into said valve and second conduit and into said second chamber and selectively discharging from said second chamber and second conduit all of the said gas theretofore therein and thus filling said second conduit and said second chamber with said incompressible liquid, then emptying all of said added liquid from the second chamber preparatory to another cycle. The gas or liquid to be sampled passes from the source thereof through a conduit purge line for a sufficient time to purge said line from the source of any fluid theretofore therein prior to passing said additional volume of sample of said fluid into said first chamber. A unique differential valve structure automatically meters the volume of displacement measuring liquid flowing under a 125 p.s.i.g. pressure drop to within ±one-half gram accuracy.

The apparatuses also include a unit for selective passage of air while precisely checking flow of displacement liquid, to provide a consistent precise measure of gas or liquid sample volume and a sample receiver connection system that is readily connected and disconnected for sample handling without damage to the precision of operation of the system.

19 Claims, 22 Drawing Figures

PATENTED OCT 22 1974　　3,842,677
SHEET 1 OF 9
FIG. 1
FIG. 2
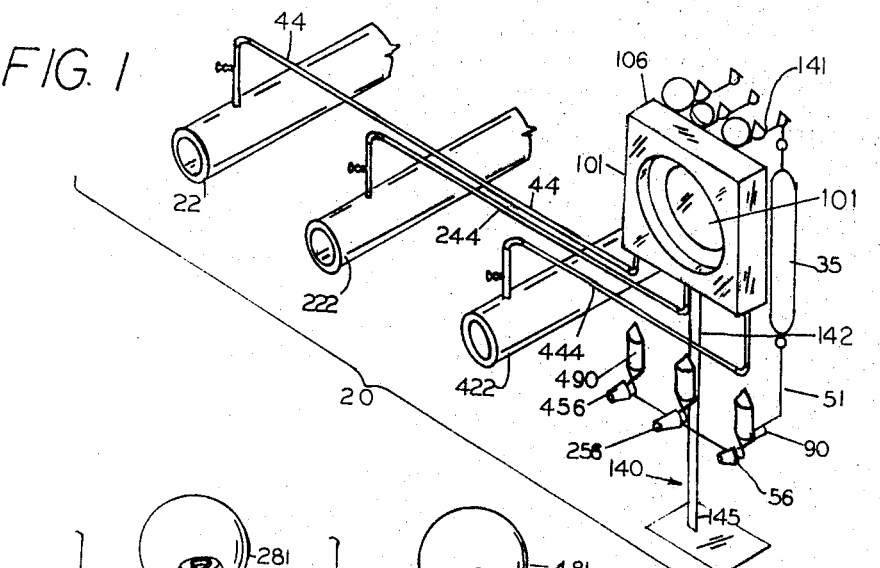
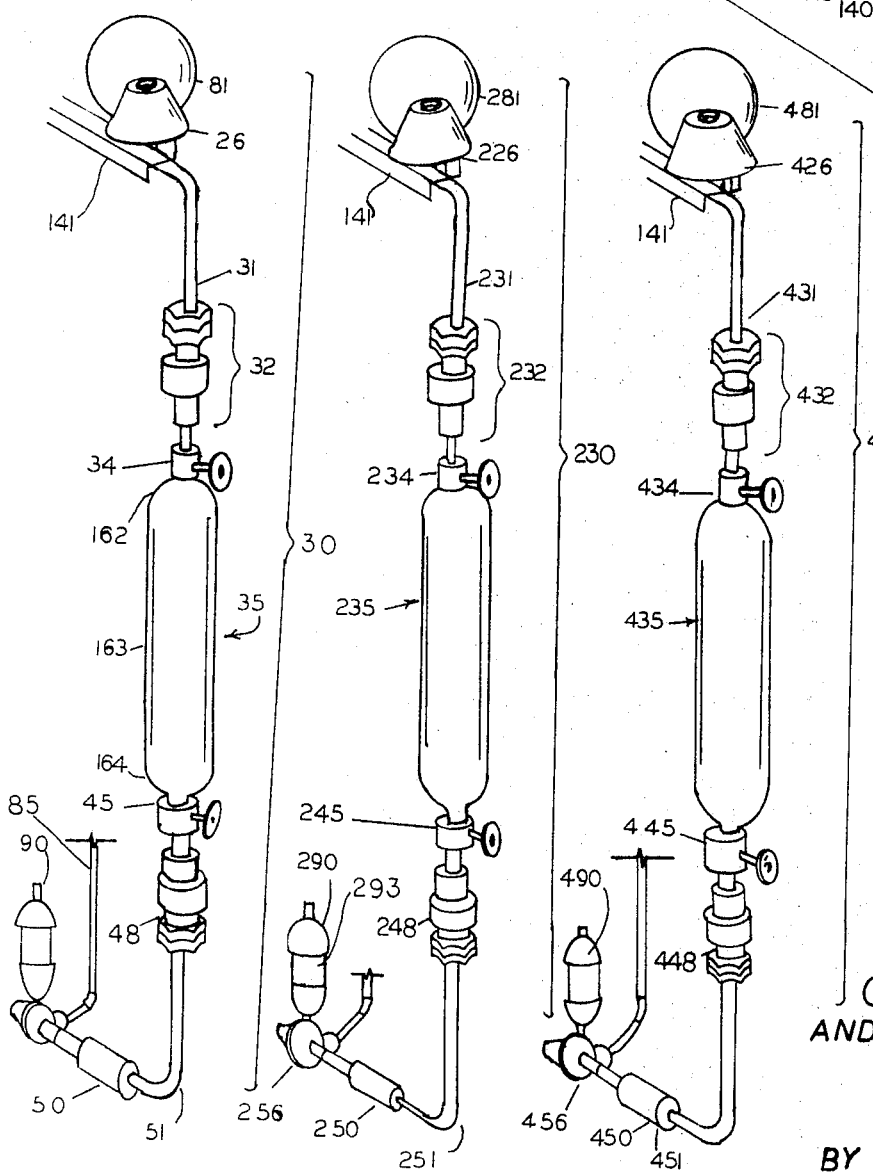
G.O. BUFKIN
AND T.P. MOORE
INVENTORS.
BY Ely Silverman
ATTORNEY

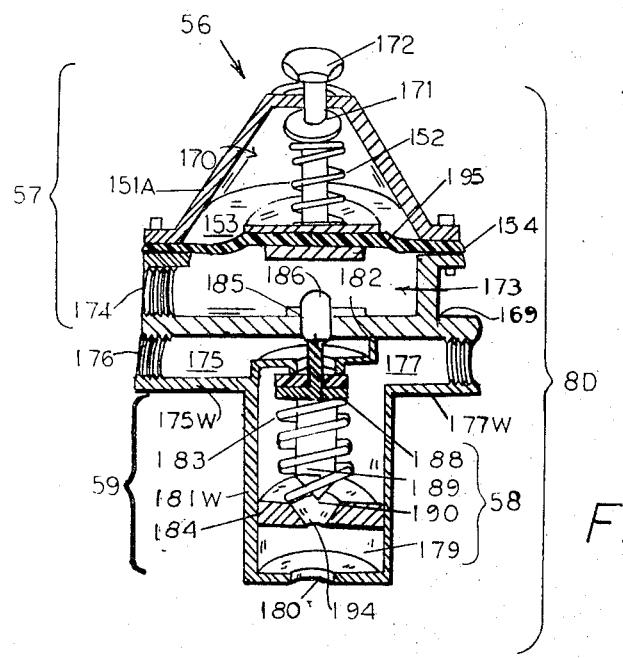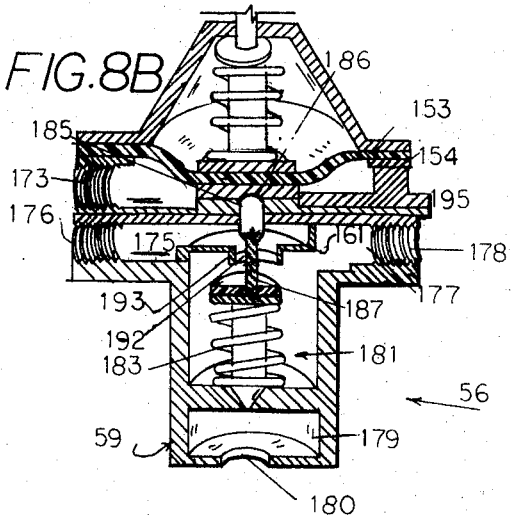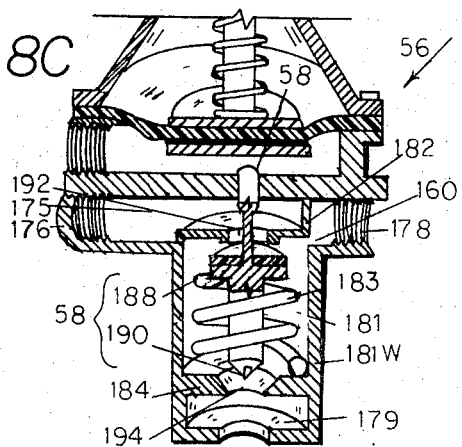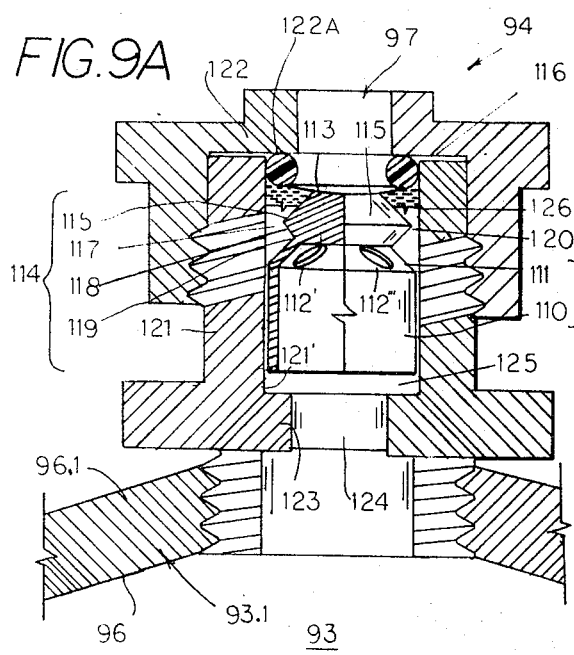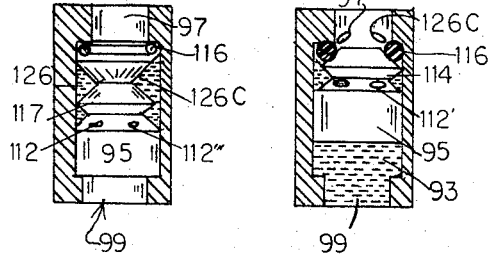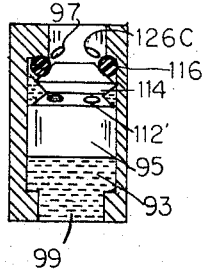

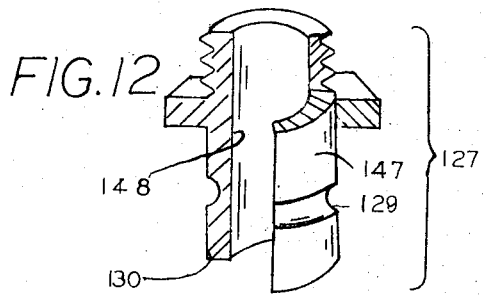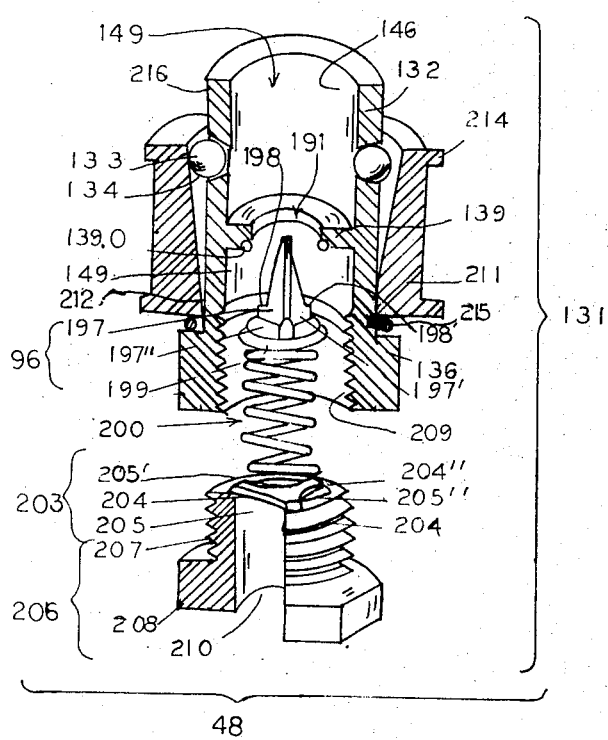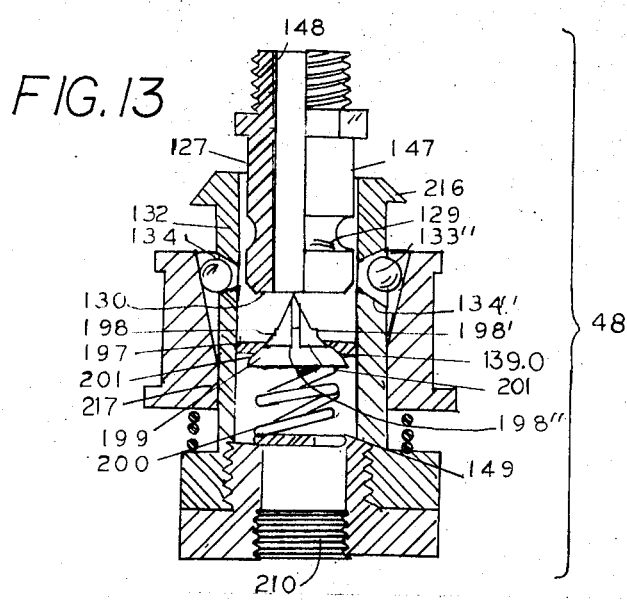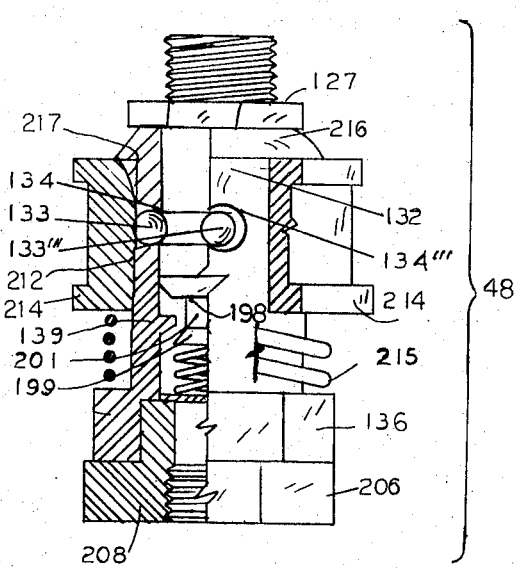

INVENTORS
G.O. BUFKIN
AND T. P. MOORE

BY Ely Silverman
ATTORNEY 3,842,677

FLUID SAMPLING PROCESS AND APPARATUSES THEREFOR

BACKGROUND OF THE INVENTION

1. Field of the Invention

The field of invention to which this invention pertains is measuring and testing samplers as for gas implements therefor and gas separation with sampling or metering means.

2. Description of the Prior Art

Prior art has required skilled technicians or highly involved machinery to draw exactly the same volume of liquid from a bottle to permit entry of gas thereinto from a sample bottle such sample bottle containing liquid under pressure. By this apparatus and process a different series of steps is performed so that the volume drawn is exact and utilizes relatively simple mechanisms and is repetitively and automatically performed.

SUMMARY OF THE INVENTION

A particular synergistic combination of a valve sequence of operation, a quick release coupling which permits a check valve action on disconnection and a differential valve that provides for a complete removal of gas prior to providing for passage of an exact amount of incompressible liquid from a fluid sampling chamber, and an automatic filling of the sampling chamber with precise increments of volume of fluid to be sampled. The flexible connection as well as the internal structure of the valves and quick release coupling allows effective and reliable replacement of the sample receiver assembly without disturbing the quantitative volumetric relations established in previous or later cycles of operation of this apparatus system for repeated passage from the sample source to the sample receiver of exact volumes of fluid to be sampled.

BRIEF DESCRIPTION OF THE DRAWINGS

FIG. 1 is a perspective view of a system 20 according to this invention arranged for sampling of three fluid lines concurrently.

FIG. 2 is a rear view of the sampling assembly 21 of FIG. 1 showing, at an enlarged scale, the sample receiver assemblies 35, 235 and 435.

FIG. 8A is a diagrammatic longitudinal vertical diametral section of a representative control valve, 56, to show some of the relations of the parts thereof and with the bottom portion of such valve exaggerated to illustrate the valve spool relations to adjacent structures, the valve spool 58 here being shown in its full elevated position.

FIGS. 8B and 8C show a view of the parts in zone 8D of FIG. 8A: FIG. 8B shows the same parts as in FIG. 8C with the valve spool 58 in its full lowered position.

FIG. 8C is a view of parts of valve 56 as in FIG. 8B adjacent the valve spool 58 at a position of such spool intermediate between its full elevated and full lowered position.

FIGS. 8A, 8B and 8C show for the valve 5 structure which is illustrative of the several like valves, 26, 36, 56, 226, 236, 256, 426, 236 and 456 of the assembly 21.

FIG. 9A is an enlarged view of zone 9A of FIG. 10 partly in vertical diametral section, and shows the displacement chamber differential valve 94 partly in section and partly in side view.

FIGS. 9B and 9C diagrammatically show positions of valve cap 95 during motion of liquid through valve chamber 93 during the operation of valve 94.

FIG. 10 is in part a side and in part a longitudinal and sectional view of a displacement control subassembly 90.

FIG. 11 is a vertical diametral section through the orifice unit 50.

FIG. 12 is an exploded view, partly in longitudinal section of the components of the bottom quick relief coupling 48.

FIG. 13 is a transverse vertical longitudinal sectional view of coupling 48 in the position of its parts with locking sleeve 211 depressed, the locking balls 133 and 133" in their release positions and the plug 127 moved upward from its locked position shown in FIG. 15; this figure shows the right side of plug 127 in side view and the remainder of the component and the other components in transverse longitudinal sectional view.

FIG. 14 shows coupling 48 in the position of its parts with the locking sleeve 211 depressed, with the locking ball 133 in its release position and the locking ball 133" in its locking position and the shoulder 130 of the plug 127 engaging the spacer plate shoulders of the valve spool 196 and the valve spool 196 in its open position. This figure, like 13, shows the right side of plug 127 in side view and the other components of that valve in transverse longitudinal sectional view.

FIG. 15 shows the coupling (and valve) 48 in the position of its parts when the locking sleeve 211 is in its upward, locking position, with locking ball 133 in its locking position and valve spool 196 open. This figure shows the right third of sleeve 211 in side view and shows the right half of sleeve 132 and spring 215 in side view and shows the left half of plug 127 in side view and shows the other components of that coupling in a transverse longitudinal sectional view.

FIG. 16 illustrates the points of novelty in a modification of assembly 21 for remote control of the timer and control subassembly 60.

DESCRIPTION OF THE PREFERRED EMBODIMENTS

Figure 3:
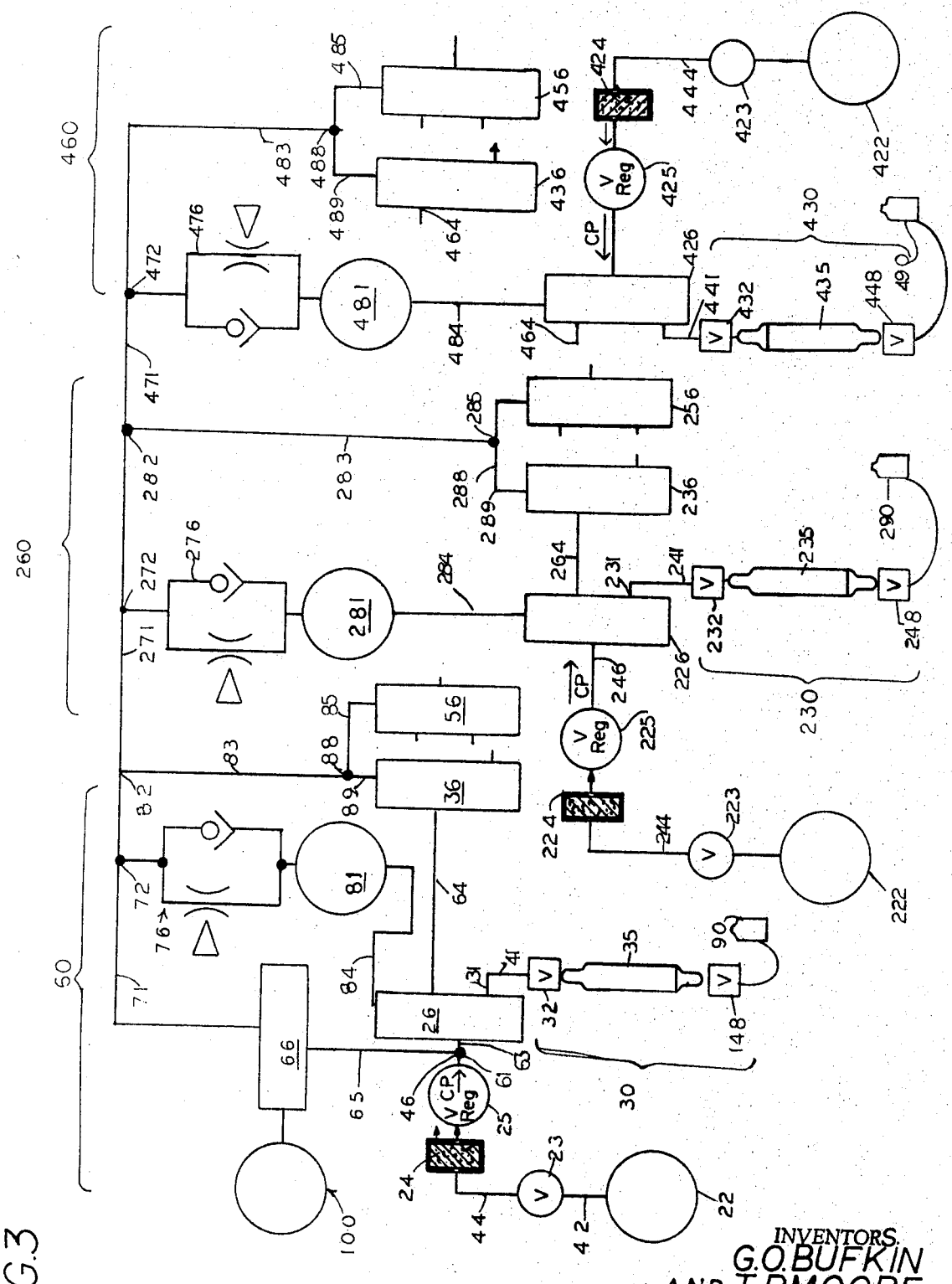
FIG. 3 is a diagrammatic view of the timer and control subassemblies 60, 260 and 460 of assembly 21 for the three sample receiver subassemblies 30, 230 and 430.

The system 20 comprises the sampling assembly 21 and the fluid lines, as 22, 222 and 422 which carry and transport the fluids which are sampled automatically by the sampling assembly 21.

This fluid, (gas or liquid) sampling apparatus 21 for fluid lines 22, 222 and 242 comprises, in operative combination, sample receiver subassemblies 30, 230 and 430 and timer and control subassemblies 60, 260 and 460.

The timer and control subassembly 60 controls the feeding of gas from line 22 to the sample receiver subassembly 30 at predetermined intervals: the sample receiver subassembly 30 comprises a self-regulating displacement control subassembly 90 and a removable sample receiver subassembly 35.

The timer and control subassembly 60 comprises a cycle initiating timer and control subassembly 100, a delay timer unit 76, and associated valves.

Valve units of sample receiver subassembly 30 and of displacement control subassembly 90 are both operatively connected to and controlled by the delay timer unit 76 and the timer unit 100.

A timer and control assembly 260 controls the feeding of gas from line 222 to the sample receiver subassembly 230 at predetermined intervals: the sample receiver subassembly 230 comprises a self-regulating displacement control subassembly 290 and a removable sample receiver subassembly 235.

The timer and control subassembly 260 comprises a delay timer unit 176 and associated valves as in subassembly 60 and is operatively connected to the cycle initiating timer and control subassembly 100 of assembly 60.

Valve units of sample receiver subassembly 230 and of displacement control subassembly 290 are both operatively connected to and controlled by the delay timer unit 276 and the timer unit 100.

A timer and control assembly 460 controls feeding of gas from line 422 to the sample receiver subassembly 430 at predetermined intervals: the sample receiver subassembly 430 comprises a self-regulating displacement control subassembly 490 and a removable sample receiver subassembly 435.

The timer and control subassembly 460 comprises a delay timer unit 476 and associated valves as in subassembly 60 and is operatively connected to the timer unit 100 of assembly 60.

Valve units of sample receiver subassembly 430 and of displacement control subassembly 490 are both operatively connected to and controlled by the delay timer unit 476 and the timer unit 100.

FIGS. 4, 5, 6 and 7 illustrate a form of each of the subassemblies 30 and 60 which components identical to component of subassemblies 230 and 260 illustrated in FIG. 3.

Accordingly, parts as 235 and 276 in FIG. 3 corresponding to the parts 35 and 76 of FIGS. 1–7 are identified by corresponding unit and 10 numerals but higher hundred digits; e.g. sample receiver subassembly 235 being the same as sample receiver subassembly 35 and delay timer unit 276 the same as delay timer unit 76, respectively, in structure and operation.

FIGS. 4–7 also illustrate a form of each of the subassemblies 30 and 60 with components identical to components of subassemblies 430 and 460 illustrated in FIG. 3.

Accordingly, parts as 435 and 476 in FIG. 3 corresponding to the parts 35 and 76 of FIGS. 1–7 are identified by corresponding unit and ten numerals but higher hundred digits; e.g. sample receiver subassembly 435 being the same as sample receiver subassembly 35 and delay timer unit 476 the same as delay timer unit 76, respectively, in structure and operation.

The operations and connections of timer and control subassembly 60 and the receiver subassembly 30 are described particularly herebelow: the operation of subassemblies 260 and 460 are substantially the same as described for timer and control subassembly 60; the operation of subassemblies 230 and 430 are qualitatively substantially the same as described for sample receiver subassembly 30.

The unit assembly 40, which comprises the sample receiver subassembly 30 and the timer and control subassembly 60, is operatively connected to a first main fluid line 22 through which line passes one fluid to be sampled. Line 22 is operatively attached to a tapline conduit 42 passing from line 22 to a cut-off valve 23. A conduit line 44 passes from the cut-off valve 23 to a mechanical filter 24 and first constant output pressure valve 25. The first constant output pressure valve 25 is operatively connected to a second constant pressure line 46. Line 46 operatively connects via a tee 61 to a timer control subassembly feed line 62 and to a sample receiver subassembly feed line 63. The line 63 passes to and through the casing 29 of a receiver control valve 26 to supply gas (or fluid) from the line 22 which is to be received and analyzed to the system 30 in a sequence and amount and manner controlled by the timer control subassembly 60 and in an amount controlled by the sample receiver subassembly 30. The line 62 is operatively connected to the timer valve 66 through a constant output pressure valve 65.

The receiver valve 26 comprises a valve spool 28, and a valve control unit 27 movable in a valve casing 29. The valve spool 28, control unit 27 and valve casing 29 and orifice 174.2 of valve 26 are shown diagrammatically in FIGS. 4–7 and are, respectively, identical structurally to the valve spool 58, control unit 57 and valve casing 59 of the valve 56 shown diagrammatically in detail in FIGS. 8A, 8B and 8C and hereinbelow described. The casing 29 has an inlet orifice 178.2 and two outlet orifices 176.2 and 180.2 corresponding to orifices 178 and 176 and 180, respectively, of valve 56.

One end of a chamber filler conduit line 31 connects to orifice 180.2 (shown in FIG. 5) in the casing 29 and the other end of the line 31 is in series with an upper lock body 131A and a lower plug 127A of a quick disconnect coupling and valve, 32, and, further, an upper cut-off valve, 34, into the upper end of sample receiver 35, a rigid vertical cylindrical gas-tight container.

The lower end of the sample container 35 is directly connected with a lower cut-off valve 45, which is connected to the end plug 127 and lock body 131 of another lower, quick disconnect coupling 48.

The lower quick disconnect coupling 48 is connected to throttling orifice 50 by a flexible hose line 49. Throttling orifice 50 is connected by a stub line 51 to the orifice 180 in the casing 59 of displacement volume receiver valve 56.

The displacement volume receiver valve 56 comprises a valve spool 58, and a valve control unit 57 movable in a valve casing 59.

The valve spool 58, control unit 57 and valve casing 59 and inlet 174 of valve 56 are shown diagrammatically in FIGS. 4–7 and are identical structurally to the valve spool 58, control unit 57 and valve casing 59 and inlet 174 of the valve 56 shown diagrammatically to larger scale in some detail in FIGS. 8A, 8B and 8C and hereinbelow described.

The line 62 is operatively connected to the timer valve 66 through a controlled output pressure valve 65. The timer valve 66 comprises a valve spool, 68, and a valve control unit 67 movable in a valve casing 69.

The valve spool 68, and valve casing 69 of valve 66 are shown diagrammatically in FIGS. 4-7 and are respectively identical structurally to the valve spool 58, and valve casing 59 of the valve 56 shown diagrammatically in detail in FIGS. 8A, 8B and 8C and hereinbelow described.

The valve casing 69 has two inlet orifices, 180.6 and 174.6 and two outlet orifices 178.6 and 176.6 corresponding to orifices 180, 174 and 180 and 176, respectively of valve 56.

The valve casing 69 has an outlet line orifice 178.6 to which a rigid conduit 71 is connected. The conduit 71 connects to a tee 72 and a tee 82. Tee 72 is operatively connected to the delay timer unit 76 and tee 82 connects to the purge valve 36 and the displacement chamber valve 56. More particularly, the tee 72 operatively connects to line 73. Line 83 connects to the control orifices 174.3 and 174 in the casings of the valves 36 and 56, respectively.

The timer delay unit 76 comprises a standard adjustable orifice 77 and a one-way check valve 78 operatively connected through a tee 79 to an accumulator chamber 81. Line 73 is connected by a tee 74 to both the timing orifice 77 and to a check valve 78 which (items 77 and 78) are, in turn, by a rigid tee 79 and lines 79' and 79'' connected to the inlet of accumulator chamber 81. The discharge end of accumulator 81 connects by control conduit lines 84 to master pressure chamber orifice 174.2 of receiver control valve 26. Control conduit line 83 connects by a tee 83 and a line 89 to control inlet orifice 174.3 in the casing 39 of the valve 36 so as to move the control unit 37 thereof. The tee 88 also connects to a control conduit line 85 and that control line 85 connects by a control orifice 174 in the casing 59 of the valve 56 so as to move the control unit 57 thereof.

The purge valve 36 comprises a valve spool 38, and a valve control unit 37 movable in a valve casing 39.

The valve spool 38, control unit 37 and valve casing 39 of valve 37 are shown diagrammatically in FIGS. 4-7 and are identical structurally to the valve spool 58, control unit 57 and valve casing 59 of the valve 56 shown diagrammatically in detail in FIGS. 8A, 8B and 8C and hereinbelow described.

The casing 39 has two inlet orifices 174.3 and 180.3 and one operative discharge outlet orifice 178, corresponding to orifices 174, 180 and 178, respectively, of valve 56: an outlet orifice 176.3 of valve 36, corresponding to outlet orifice 176 of valve 56 is plugged by a plug 53.

The line 64 from valve 26 is operatively connected to the inlet orifice 180.3 of purge valve 36. Valve 56 comprises a rigid right conical hollow hood 151 which houses a vertical helical spring 152 which spring bottom seats on and bears against a rigid circular movable plate 153.

The volume under the hood is 151 and above the diaphragm 154 is referred to as the hood chamber 170 and it is in this chamber 170 that the coaxial spring 152, screw plate 171 and plate 153 are located.

Plate 153 bears against an air tight flexible circular diaphragm 154 and, at the bottom of the diaphragm 154 is a bearing plate 195 which plate bears against the top of spool head 186 of the spool 58.

A rigid screw plate 171 bears against the top of the spring 152 and is adjusted by an adjustable threaded screw 172 which is adjustably screwed into a threaded hole in the top of the hood 151. The wall of the hood 151A has a perforation therein, 151A for equalization of air pressure. The circular plate 153 is almost but not quite the size of the area of the conical hood 151 at its bottom; the diaphragm allows vertical movement of the plate 153 up and down against the spring 152. The screw plate 171 provides a seat for the top of the spring 151 and the compressive force in the spring 152 is adjusted by screw 172.

Below the diaphragm 154 is a master pressure chamber 173 bounded at its bottom by a circular wall 169, with spool 58 in its center. Below the chamber 173 is located, on the left side of spool 58, a left slave chamber 175 and, on the right side of spool 58 a right slave chamber 177. Immediately below the chambers 177 and 178 there is located a valve chamber 181 and, below the valve chamber 181 a bottom or lower slave chamber 179. The left slave chamber 175, the right slave chamber 177, the bottom slave chamber 179 and the valve chamber 181 are each provided with rigid airtight walls 175W, 177W, 179W and 181W, respectively. The left slave chamber 175 is separable from the right slave chamber 176 at the valve chamber top wall 182 and the right slave chamber is separable from the bottom chamber 179 at the valve chamber bottom wall 184. An orifice 176 leads into the left slave chamber and orifice 178 leads into the right slave chamber and orifice 180 leads into the lower chamber. An orifice 174 leads into the pressure chamber 173.

The valve chamber 181 has a top wall or separation plate 182 which is provided with a central throat or top orifice 192; the valve chamber 181 at its bottom is provided with a bottom wall 184 in the center of which is located a valve point (or bottom) orifice 194. An orifice 160 connects chambers 181 and 177.

The valve spool 58 comprises in series, rigidly connected, a co-axial cylindrical spool head 186 above a narrower neck 187 with neck 187 in turn above a wide shoulder 188, which shoulder in turn is above a cylindrical long spool shaft 189 which terminates at a bottom conical valve spool point 190. The valve spool head 186 fits tightly but movably into an orifice 185 in the wall 169 between the chamber 173 and chambers 177 and 175. The spool head 186 is slidably located in that orifice 185 in that wall 169 with an air tight fit and is co-axial with the spring 152. The top of a helical spring 183 seats against the bottom of spool shoulder 188 and the bottom of the spring 183 seats on the bottom wall 184 of the valve chamber, and uses plate 184 as a spring seat and circumscribes the valve point orifice 194 in the bottom wall 184. Orifice 194 is conical in shape.

Figure 4:
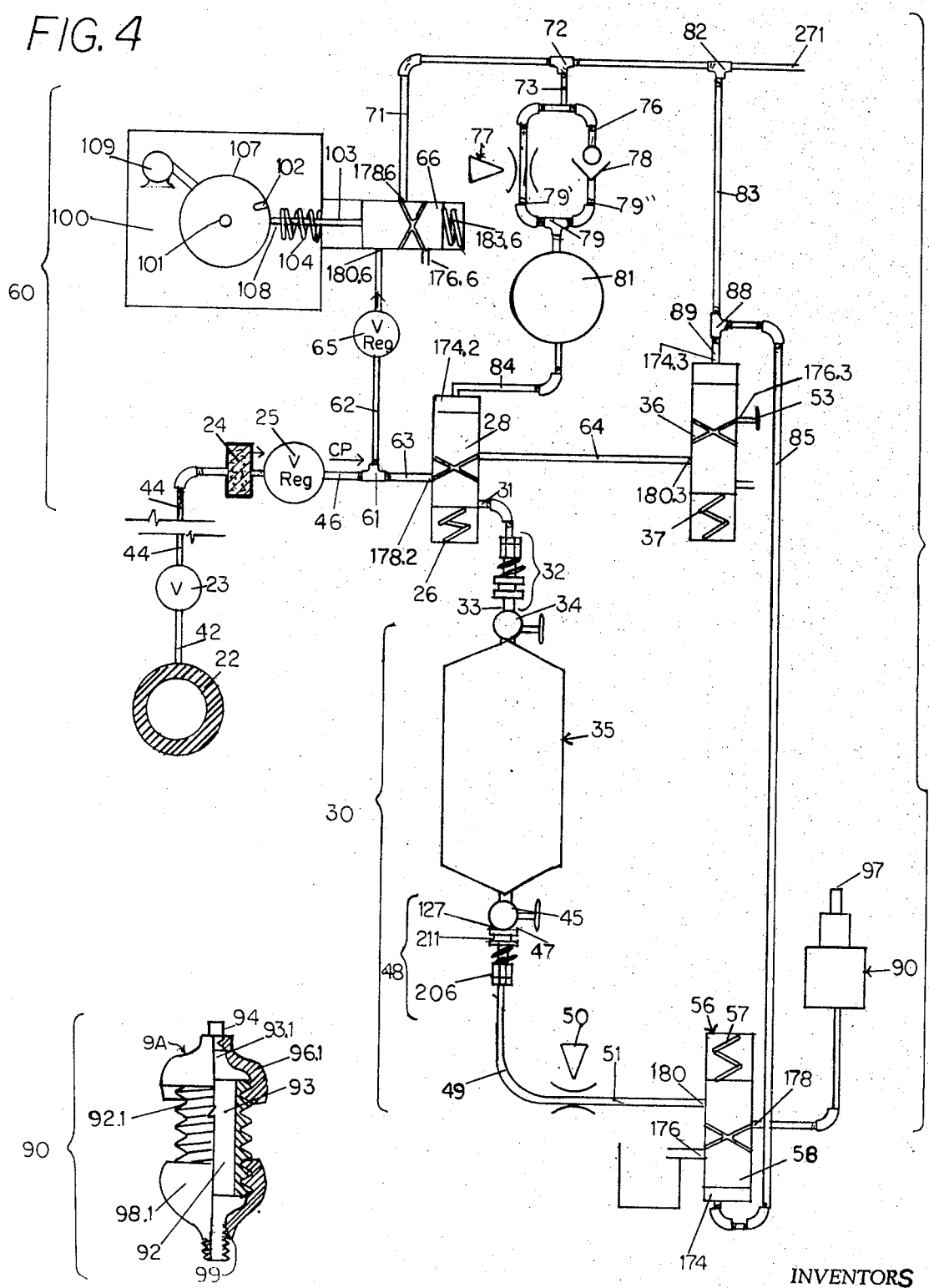
FIGS. 4, 5, 6 and 7 are diagrammatic showings of the sequential relations during the operations of the unit subassembly 40, comprising one timer and control subassembly, 60, and one sample receiver subassembly, 30, operatively connected therewith.
Figure 6:
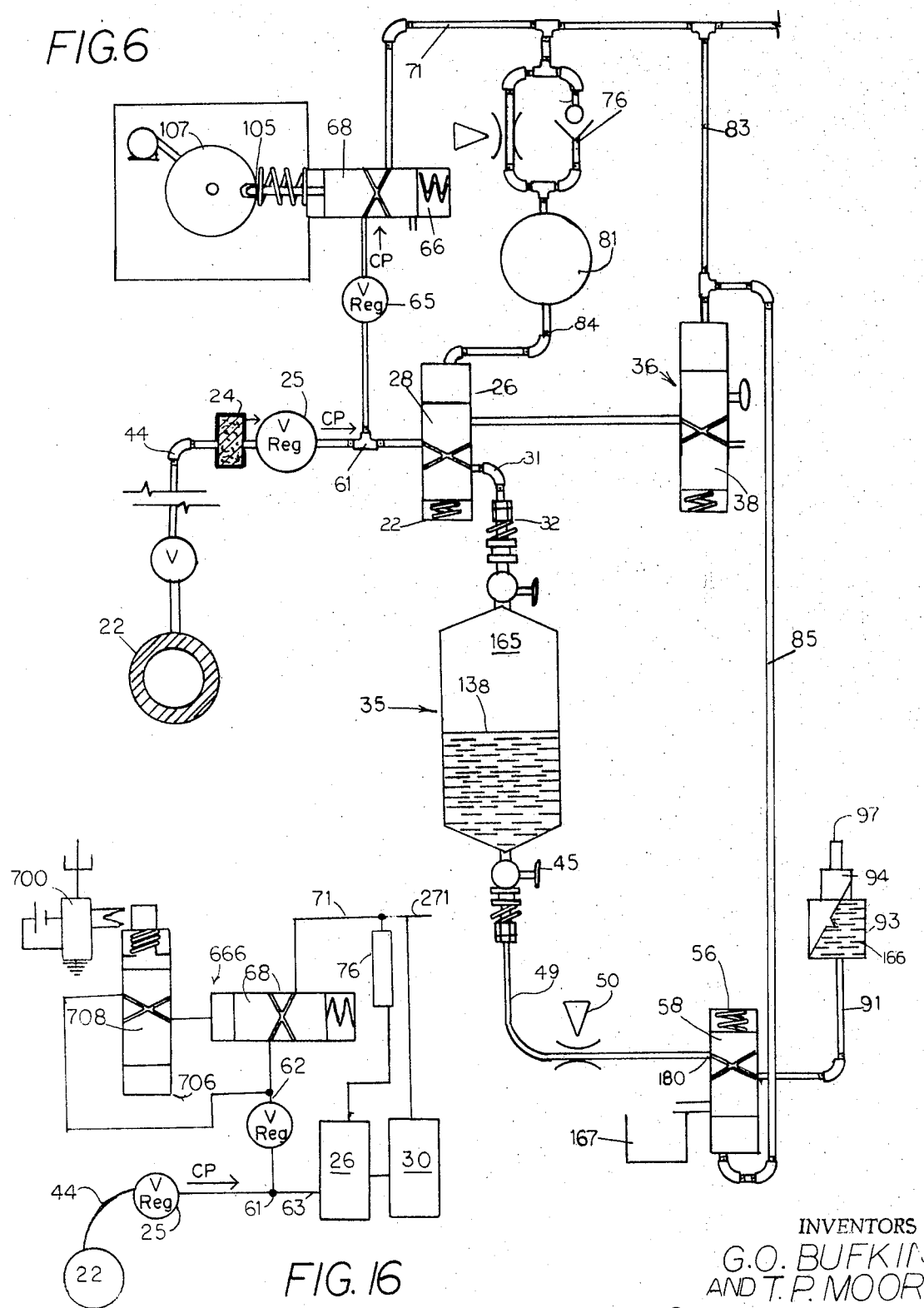

The orifice 192 has, as shown in FIGS. 8B and 8C a vertically and lower depending cylindrical lip 193 which is deformable and resilient to form an air-tight fit on shoulder 188 and thereby to close the orifice 192 in the top wall separation plate 182 between the left and right slave chambers 175 and 177 in position of parts shown in FIGS. 6 and 8A wherein the spring 183 urges the valve shoulder 188 to a locking engagement with the lip 193 of orifice 192 and gas pressure in chamber 173 cancels the downward action of spring 152. The neck 187 is then located in the orifice 192 and the shoulder 188 is located immediately below the orifice 192 and in a gas-tight contact therewith. From the position of parts shown in FIGS. 8A and 6 the shoulder 188 may move away from the orifice 192 to the position of parts as shown in FIGS. 4 and 8B as below described. With gas pressure in chamber 173 removed spring 153 presses plate 195 against head 186 of spool 58 and moves spool 58 to the position of parts shown in FIG. 8B: the spool point 190 then forms a gas-tight seal with the orifice 194 and there is free flow from chamber 175 to 177 because of free flow through orifice 192 in plate 182.

When the pressure in the chamber 173 exceeds the net force of the spring 152 against the plate 153 less the force of the spring 183 against shoulder 188 of valve spool 58, the valve spool 58 is moved upwards from the position shown in FIG. 8B to the position shown in FIG. 8A and the shoulder 188 forms a sealing contact with the lip 193 of the orifice 192 while, concurrently the point 190 is removed from the orifice 194. As shown by the position of parts shown in FIG. 8A when the shoulder 188 forms a gas-tight seal with the orifice 192 there is free flow from orifice 180 via chambers 179, 181 and 177 and orifice 178 although there then is no fluid flow from orifice 176 and chamber 175 to chamber 177 or to the chamber 179.

When the gas pressure in the chamber 173 is less than the net of (a) the downward (as shown in FIG. 8A) force of the spring 152 against the plate 153 less (b) the force of spring 183 against shoulder 188 of valve spool 58 the valve 58 is moved downward to the position shown in FIG. 8B and the shoulder 188 loses its sealing contact with the lip 193 of the orifice 192 while, concurrently the point 190 is forced into the orifice 194 and, as shown in FIG. 8B, forms a gas-tight seal between such point 190 and such orifice 194 whereby passage from or to either of left slave chamber 174 and right slave chamber 177 to or from lower slave chamber 179 is cut off.

The valve hood 151 and the chamber walls 174W, 177W, 179W and 181W form and are referred to herein as a valve casing 59; the spring 152 and the diaphragm 154 and the plates 153 and 169 form and are referred to herein as control unit 57. In summary, the movement of the control unit 57 controls the movement of the spool 58 in the casing 59.

The timer initiator unit 100 comprises a notched circular timing wheel 101 which is driven at a uniform rate of angular speed by a standard electric or spring wound motor 109. A rigid arm 103 having a rigid shoulder 105 is urged toward wheel 101 by a spring 104, one end of which spring bears against the timer frame 106 and the other end of which spring bears against the shoulder 105 and causes the free or finger end 108 of arm 103 to engage either the notch 102 or the edge 107 of the wheel 101. The other, base, end of the arm 103 engages the spool 68 and is firmly fixed thereto. A spring 183.6, identical in structure to the spring 183 of the valve unit 56, urges the spool 68 towards the position of parts shown in FIG. 8A, 5 and 6, when the finger end of arm 108 engages the wheel notch 102; at other times in the cycle of operation of the timer initiator unit 100 the edge 107 of the wheel holds the arm 103 and, thereby spool 68 in the position of parts shown in FIGS. 8B (for corresponding parts of valve 56) 4 and 7. Motor 109 drives the wheel 101 clockwise.

The differential displacement control subassembly 90 (see FIG. 10) comprises a vertical differential displacement valve chamber 93 and a valve 94. The differential displacement chamber 93 is formed in and by an externally threaded rigid vertical short nipple 92.1, an upper reducing coupling or fitting 96.1, and a lower reducing coupling or fitting 98.1 and is operatively connected at its top to a displacement chamber differential valve 94 (see FIG. 9A). The displacement chamber 93 within the nipple 92.1 and fittings 96.1 and 98.1 is bounded by a cylindrical displacement chamber wall surface 92, a conical roof 96 with an upper outlet 93.1 and a lower conical wall 98.1 surrounding a chamber inlet 99.

The valve 94 comprises a vertical cylindrical valve chamber 125 with a differential valve sealing cap 95 therein. Chamber 125 is located in and defined by a cylindrical chamber wall 121, a stepped top annular valve shoulder 122, a lower annular valve shoulder 123 and an upper annular valve outlet orifice 97 in center of annular shoulder 122 and a lower valve inlet orifice 124.

The differential sealing cap 95 comprises a valve shirt 110 that slidably yet closely fits the interior surface 121' of the wall 121, a perforated conical shoulder surface 111 with equally sized and symmetrically located holes 112, 112', 112'' and 112''' and an imperforate head 114. The head 114 has an upper flat circular face 113 which is coaxial with and laterally contiguous to an upper conically sloped face 115 terminating in a lateral edge 117, which lateral edge is also the upper lateral edge of a lower conically sloped head face 118 that terminates in a central neck 119; edge 117 is very closely adjacent to yet spaced away (0.030 inch distant) from the inner wall 121' of the chamber 93.

An elastically compressible oily rubber o-ring 116 is located between the upper conical cap face 115 and a seat 122A on the bottom surface of the valve roof 122. A circular slit 120 is located between the circular lateral edge 117 and the inner cylindrical surface 92 of differential valve chamber. Slit 120 is wide enough (0.030 inch) to allow air to pass through such circular slit. Surfaces 121', 111, 118, 115 and o-ring 116 are wetted by water, hence when water passes upward through the holes 112, 112', 112'' and 112''' through the conical surface 111, it does not pass freely through the slit 120 between head lateral edge 117 and wall surface 121'. As a measure of such sealing, when the valve 94, assembled as in FIG. 9A, is turned upside down and water is put into the normally lower orifice 124 and fills chamber 125, no water passes out of normally upper orifice 97.

The slit 120 between the lateral edge 117 of cap head 114 and chamber wall 121 is deliberately large enough to allow flow of air therethrough but, as below described prevents free the flow of displaced liquid upwards past the cap 95. With fixed pressure across slit 120 as exists when water is flowing upward of line 91 toward valve 94 with a 120 p.s.i.g. pressure in chamber 35 and atmospheric pressure exterior (upward of) to opening 97 of valve 94 and in line 91 and chamber 125 the slit 120 permits only a predetermined and fixed amount of water to pass through the valve slit 120 during movement of the valve cap 95 from its lower position shown in FIG. 9B to its upper position shown in FIG. 9C.

Valve 94 provides as below described that the valve 94 will pass air upwards therethrough but no water except vapor and a small fixed miniscus discharge.

Quick release coupling 48 comprises an end plug 127 and a lock body 131. The end plug is movable into and out of or may be firmly locked in the lock body 131 which may act as a check valve, hence couplings 32 and 48 are referred to as valves as well as couplings.

The lock body 131A and end plug 127A of quick release coupling 32 are structurally identical, respectively, to lock body 131 and end plug 127 of quick release coupling 48 but coupling 32 is upside down relative to coupling 48. In coupling 48 end plug 127 is above lock body 131 while in coupling 32 the lock body 131A is above the end plug 127A. The bottom of end plug 127A is connected to the top of upper cut-off valve 34 and the top of end plug 127 is connected to the bottom of cut-off valve 35: the bottom of lock body 131 is firmly connected to the upper end of hose 49.

The end plug 127 is a rigid sleeve with a cylindrical outer surface 147 and a cylindrical inner surface 148. The inner surface defines a cylindrical channel 128. A circular peripherally open annular locking groove 129 is located on the outer surface 147; it opens outward and serves to engage a plurality of rigid locking balls 133, 133', 133'', 133''', each of like size, shape and strength. The plug 127 terminates at its bottom (as shown in FIGS. 2, 4–7 and 13–15) in a rather wide annular shoulder 130 which shoulder operatively engages the shoulders, as 198', 198'' and 198''' of the spacer plates, as 197, 197' and 197'''.

The lock body 131 is a subassembly which comprises, in general, an intermediate sleeve 132, a valve spool 196 with a spring load mechanism therefor, a base 206, and a lock sleeve 211 in operative combination. In general, the valve spool 196 is located within the intermediate sleeve 132; the sleeve 132 is removable but firmly attached to the base 206 and the lock sleeve 211 is spring loaded on and is movable axially as well as rotatably on the periphery of the intermediate sleeve 132. The lock sleeve 211 serves to either releasably yet firmly hold or lock the end plug 127 in position whereat it engages the valve spool 196 and holds such spool in position as shown in FIG. 15 whereat it does not block passage of fluid through the lock body 131, or the lock sleeve may be moved to release the end plug 127 from such locked position, as shown in FIG. 13.

The intermediate sleeve 132 is a rigid cylindrical sleeve with an interior cylindrical channel 149; an annular shoulder orifice 139 is firmly fixed to the interior surface 146 of the sleeve 132 near the middle of that sleeve (see FIG. 12). The sleeve 132 has smooth outer and inner wall surfaces with a plurality of axially symmetrically located locking ball holes 134, 134', 134'' and 134''' located therein in a ring coaxial with sleeve 132. Each of the holes as 134 is conically shaped with the base of the cone directed radially and the apex directed centrally, and the axis of each such conical shape is perpendicular to the central longitudinal axis of sleeve 132. At the bottom (as shown in FIGS. 12, 13, 14 and 15) of the intermediate sleeve 132 is a laterally or radially projecting lower, spring shoulder 136 and, at the top of intermediate sleeve is a laterally or radially projecting upper stop shoulder 216. The outer cylindrical surface of intermediate sleeve 132 is smooth, the interior surface of sleeve 132 is smooth at the top and threaded, at 209, below the orifice shoulder 139.

The valve spool 196 comprises three rigid vertically extending triangularly shaped spacer plates, 197, 197' and 197'' and a rigid circular base 199. Each plate has a downwardly and laterally sloped side edge, a bottom edge and a central end. All the central ends are firmly joined; each bottom edge is firmly joined to the top of base 199. Each laterally sloped side edge is provided, near to but definitely vertically spaced away along the side edge from the bottom of each such plate, a shoulder, as 198, 198', and 198'' for each of the plates 197, 197' and 197''', respectively. The spacer plates fit freely for vertical motion within the orifice 191 in orifice shoulder 139, but the valve spool base 199 is too large to pass upward through that orifice; in its closed position base 199 makes a gas-tight seal with an o-ring 139.0 located at the bottom of such shoulder. The base 199 is a rigid flat truncated cone adapted to better form a gas-tight seal with the o-ring 139.0 in its sealing position, as in FIGS. 14 and 7.

The base 206 comprises an externally threaded sleeve 297, a shoulder 208, a spider 203 and a spring 200 in operative combination. The shoulder 208 is firmly attached to the outside of the threaded sleeve 207 for manipulation thereof. The periphery of sleeve 207 threadedly fits into and engages the threads 209 on the bottom portion interior of intermediate sleeve 132. A cylindrical channel 210 is located within the sleeve 207. The top of the base sleeve 207 supports a three-armed spider 203; the arms as 204, 204' and 204'' of the spider are axially symmetrical and outline the spider orifices 205, 205' and 205''. The orifices 205, 205' and 205'' are continuous with cylindrical channel 210 within base 206. Channel 210 is continuous with the bottom portion of the central channel 149 in the intermediate sleeve 132. A resilient helical metal valve spring 200 is compressed between the base 199 of the valve spool 196 and the spider 203 in the usual operative position of parts of quick release coupling 48 as shown in FIGS. 13–15: in such position the threads of base sleeve 207 engage the threads of intermediate sleeve 132 and the valve spool 196 is urged (when end plug 127 is not locked to sleeve 132, and hence plug 127 is free to move, as in FIG. 13) into contact with shoulder 139 and forms a gas-tight fit therewith.

The lock sleeve 211 is a rigid cylindrical sleeve located axially movable along the peripheral surface of sleeve 132. The lower, narrower interior surface 212 of the locking sleeve 211 forms a smooth sliding fit on the exterior surface of the intermediate sleeve 132 and is continuous with an upper conically bevelled narrower portion 217. The sleeve 211 has a lower laterally extending shoulder 214 that engages a lock sleeve spring 215 that seats on the base shoulder 136 and is compressed therebetween and forces the sleeve 211 resiliently yet firmly upwardly therefrom. In the upwardly moved position of the sleeve 211, as shown in FIG. 14, the upward motion of the sleeve 211 is limited by engagement of the top of sleeve 211 with an upper stop 216, firmly attached to intermediate sleeve 132. In such upwardly moved position of the locking sleeve 211, the narrower inner lower surface 212 of lock sleeve 211 engages the locking balls as 133, 133', 133'' and 133''' and holds each of such balls firmly in the groove 129 of the lug 127, as in the position of parts shown in FIG. 15 and used in FIGS. 2–6.

When the locking sleeve 211 is in its downwardly moved position as shown in FIGS. 13 and 14, the upper enlarged inner surface 217 of the locking sleeve 211 does not force or urge the locking balls as 133, 133', 133'' and 133''' inwards the amount or distance that the narrower portion 212 of the interior surface of the sleeve 212 does as shown in FIG. 15; accordingly the locking balls 133, 133', 133'' and 133''' may be moved outwards of holes 134, 134', 134'' and 134''', respectively by movement of end plug 127 outwards of sleeve 132. Then the plug 127 is no longer held downwards in the chamber 149 by such locking balls, and may be freely moved out of engagement with such balls and the sleeves, as 132 and 211. Additionally, to insert the plug 127 into chamber 149, the sleeve 211 must be first moved towards shoulder 136, downwardly in FIGS. 13-15, to the position of parts as shown in FIGS. 13 and 14 so that the shoulder 130 may be freely moved towards shoulders of the spool 196 and past the locking balls as 133, 133', 133'' and 133'''.

In the position of plug 127 wherein it is held downwards by the locking balls 133', 133'' and 133''', the shoulder 130 of plug 127 engages the spacer plate shoulders, as 198, 198' and 198'', as shown in FIG. 14. The locking balls, as shown in FIG. 15, then fix plug 127 and its lower shoulder 130 relative to intermediate sleeve 132 and the orifice shoulder 139. The engagement of shoulders 198, 198' and 198'' with shoulder 130 moves the spool 196 downwards from its sealing position within orifice 191 as shown in FIG. 13 to the position whereat the spool base 199 is spaced away from the o-ring 139O, as shown in FIGS. 14 and 15: in such (FIG. 14) position of spool 196, the valve channels, as 201 and 201' between the spacer plates 197, 197'' and 197''', respectively, (and a third valve channel between spacer plates 197 and 197' which third valve channel is not illustrated) provide free passage for fluid; e.g. gas, between the portion of chamber 149 above the orifice shoulder 139 and the portion of chamber 149 below that shoulder (and vice versa).

Accordingly, when the plug 127 is locked by the balls 133, 133', 133'', and 133''' in the position thereof shown in FIG. 15, the control channel 128 of plug 127 is in open communication with the upper portion of channel 149 and the orifice 191 in shoulder 139, and through the valve channels, as 201 and 201' of spool 196 to the channel 210 of the base 206 and the lock sleeve spring 215 firmly yet resiliently holds the sleeve 211 in position against the locking balls so such open communication is maintained. When, however, the locking sleeve 211 is moved downward towards shoulder 136 against the force of spring 215 until the locking balls may be moved laterally out of engagement with the peripheral locking groove 129 on plug 127, as shown on left side of FIG. 14, and in FIG. 13, the plug 127 is removable from the lock body 131 and, with such removal, which occurs manually in less than 0.2 second, the valve spool base 199 comes into sealing engagement with the shoulder o-ring 139.0 and prevents passage of fluid upward through base channel 210 and chamber 149 of intermediate sleeve 132.

The timer unit 100 and assembly 21 are supported on a standard 140: the housing of timer frame 106 is firmly attached to a vertical standard 142: an upper deck frame 141 is attached to and supported on housing 106 and timer assemblies 76, 276 and 476 are attached thereto and assemblies 35, 235 and 435 are suspended therefrom: a lower rigid frame 145 supports the displacement control subassemblies 90, 290 and 490; each of the flexible hoses 51, 251 and 451 are supported from an upper end adjacent the quick disconnect couplings 48, 248 and 448.

The orifice unit 50 comprises a threaded male and female fitting having a skirt 156 and a head 158 joined at a shoulder 157 with a narrow straight smooth walled cylindrical channel 159 extending through the shoulder. Channel 159 has a much smaller diameter than the lines 51 and 49 to which unit 50 is connected. A female thread in skirt 156 joint flexible hose line 49 and the head 158 has a male thread joined to a very short line 51 passing to orifice 180 of valve 56.

The operation of this system 20 is here described as starting where the sampling apparatus 21 is in the position of parts thereof whereat no sampling is occurring and the system 20 is prepared to begin a cycle of repeated periodic sampling from each of a plurality of conduits, as 22, 222 and 422 containing fluid passing therethrough each with pressure in excess of atmospheric. The operative positions of the valve bodies as 28, 38 and 58 and 68 of valves 26, 36, 56 and 66, respectively, are then shown in FIG. 4. Chamber 35 is then filled with a liquid that is practically incompressible and has no appreciable capacity to dissolve the components of the fluids sampled--e.g. water in case of hydrocarbon gaseous mixtures, and mercury where water-soluble components, as $H_2S$ and water vapor, might be met.

Prior to initiation of the sampling procedure the timer unit 100 is located so that the edge 107 of the timer wheel 101 contacts the spring loaded arm 103 and holds the valve spool 68 of the valve 66 in the position of parts shown in FIGS. 4 and 8B.

Gas under pressure of line 22 then passes from the line 22, through line 42, usually at a pressure of over 125 p.s.i.g. to the open mainline cut-off valve 23 and line 44, trash filter 24 and constant output pressure and reducing valve 25 where its pressure is reduced to 125 p.s.i.g., thence via line 46 to the tee 61 and, therefrom (a) via line 62 and a second constant output pressure valve 65 to orifice 180.6 of valve casing 69 of valve 66 and (b) via line 63 to and through the orifices 178.2 and 180.2 of valve 26 and line 64 to orifice 180.3 of purge valve 36 to plug 53.

Initiation of the sampling procedure for each incremental addition of sampled gas to the container 35 after the first, is by steps of operation of the sampling apparatus 21 as follows.

The timer unit 100 is turned by clock 109 so that the notch 102 of the timer wheel 101 receives and contacts the finger end 108 of the spring loaded arm 103. The spring 183.6 then moves the spool unit 68 of the valve 66 to position of valve parts shown in FIGS. 5 and 8A for spool 58.

This permits the to-be-sampled fluid (or gas) under pressure flow which had theretofore been blocked by the valve spool 68 of the valve 66: the fluid passes through the chambers (as 179 and 177 of valve 56) in the valve 66 to the conduit line 71 and, therethrough, to the tees 72 and 82. From tee 72 the fluid (or gas) flows rapidly but at a controlled rate through the adjustable orifice 77 and not at all through the check valve 78.

The control valve 26 comprises a valve spool 28 and a valve control unit 27 movable in a valve casing 29.

The valve spool 28, control unit 27 and valve casing 29 of valve 27 are shown diagrammatically in FIGS.

4-7 and are respectively identical structurally to the valve spool 58, control unit 57 and valve casing 59 of the valve 56 shown diagrammatically in detail in FIGS. 8A, 8B and 8C and hereinbelow described.

Figure 5:
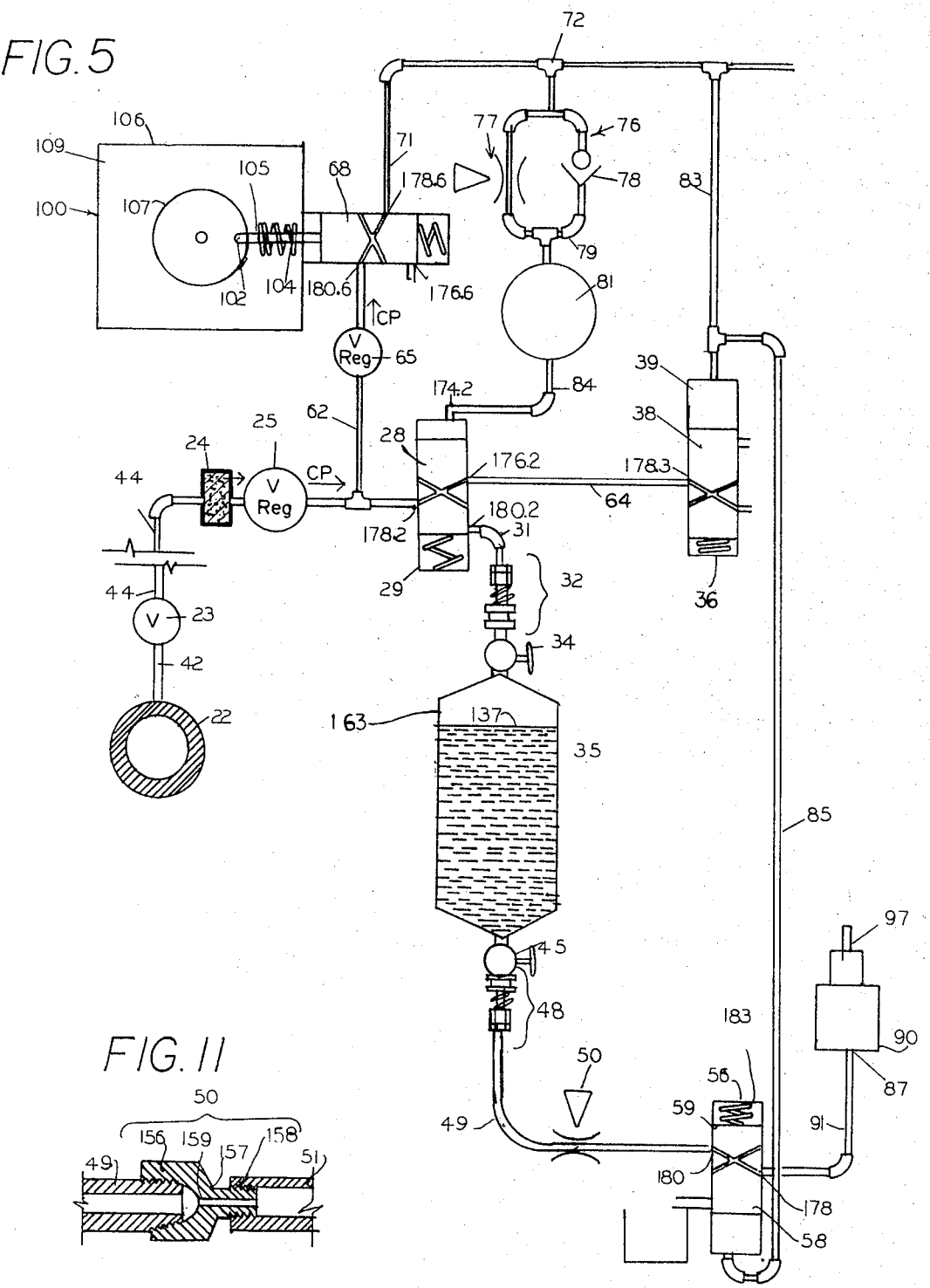

Accumulator chamber, 81 (as 281 and 481) fills over a predetermined period of time with gas (from valve 65) at a predetermined pressure in the common manner for timing devices of this type and, after such predetermined time, which time is determined by adjustment of orifice 77 in view of length of line 44 from line 22 to valve 26, the gas in accumulator chamber 81 reaches a sufficiently high pressure to overcome (via line 84) the spring loading of control unit 27 (against spool 28) in the valve 26 and causes the valve spool 28 to be rapidly moved into the position thereof shown in FIGS. 5 and 8A.

During the predetermined period of time in which gas is (a) passing into the accumulator 81 and (b) passing from the accumulator 81 into the chamber within the valve casing 29 at a pressure insufficient to move spool 28, gas is also passing from the tee 82 via lines 83 and orifice 174.3 directly into the master chamber orifice 174.3 within the valve body 39 of the valve 36 and rapidly moves the valve body 38 in valve 36 from the position thereof shown in FIG. 4 (and for a like valve 56 in FIG. 8B) to the position therefor shown in FIGS. 5 and 8A. This, accordingly, provides for the connection of the orifices 180.3 and 178.3 and the conduit 64 and the discharge of gas from mainline 22 to lines 44, 63 and 64 for a time sufficient to clear the line 44 of any and all fluids theretofore remaining in such line 44 from any previous sampling procedure of line 22.

In a valve as 56, adjustment of the adjustable threaded screw 172 adjusts the compressive force of spring 152 against the movable plate 153; such adjustment is also provided for in each of the valves 26, 36 and, in the variation shown in FIG. 16, in valve 666.

During the period of time (determined by setting of adjustable orifice 77 for assembly 60) prior to accumulator 81 filling at a pressure sufficiently elevated to move spool 28 of valve 26 valve 56 is connected as shown in FIG. 5, but valve 26 is connected, as shown in FIGS. 4 and 5 as gas passed by valve 26 to tee 82 passes to chamber 174 of valve 56 and causes spring 153 to be compressed and valve spool 58 to move upward from its position shown in FIG. 8B to the position thereof shown in FIG. 8A.

When valve 56 is in position of parts shown in FIGS. 8A and 5, liquid 135 flows from chamber 35 into line 49 and past orifice 150 into chambers 175, 181, 177 and line 91 and displacement chamber 92 and valve chamber 121; the initial pressure is the pressure of the line 22 or valve 25, usually 125 p.s.i.g. applied to top of liquid in chamber 35 and this is sufficient to very rapidly fill line 91, and chamber 92 and 94. While the liquid 135 pours into the chamber 92 it drives the air theretofore therein upward ahead of the top surface of such advancing liquid; also, the air theretofore in line 91, chambers 92, 177 and 181 is driven to and escapes through the slit 120 and holes 112, 112', 112" and 112'" of cap 95. The roof head 114 stops spray from passing out of orifice 97 with the escaping air and the slit 120 and wall 121' prevents droplets carried through holes, as 112 and 112' from passing outward of outlet 97 with such air flow. When liquid first reaches slit 120 as in FIG. 9B a miniscus 126 forms as in FIG. 9B while cap 95 is moved upward to position of FIGS. 9A and then 9C.

The circular surface 113 of the head 114 above conical surface 115 is slightly smaller in diameter than the area of the circle at which contact is made between the o-ring 116 and the surface 115. Accordingly, the corresponding central portion 126C of the volume of the liquid meniscus central of that circle of contact at position of cap 95 in FIG. 9B, is separated from the remainder of the miniscus in the closed position of cap 95 shown in FIG. 9C; the volume of such separated portion is the same at any cycle of operation of the subassembly 30 and is popped out of the orifice 97 by the impact of head of cap 95 on o-ring 116 of valve 94.

The volume of liquid cut off by o-ring from surface 115 is driven out of orifice 97. This is a fixed amount and guarantees no air is entrapped in chamber 93 or valve 94. Otherwise expressed, the superatmospheric pressure of gas above the liquid 135 in chamber 35 drives a predetermined yet fixed quantity of such liquid through the slit 120. As the pressure of the driving gas above the liquid in chamber 35 is the same in all cycles of the operation, and as the restricting orifices 151 is the same, and the valve cap 95 starts moving upward at a fixed part in the operation (of discharge of liquid from chamber 35 to displacement chamber 22 and valve chamber 122) only after the top surface of the liquid displaced from chamber 35 and line 49 reaches the inlet 124 to the valve 94, the amount of liquid discharged through orifice 97 is the same in all such cycles of operation. The volume of liquid drawn from chamber 35 during each such step of movement of valve 56 from its position shown in FIG. 4 to position shown in FIG. 5 to connect line 41 and chamber 93 is the sum of volume of the liquid flowing into and filling the displacement chamber 93, valve chamber 94, pipe 91 valve chambers 181, 179 and 177 and leaks. Such volume is drawn from the volume of liquid therefore in chamber 35 and in hose line 49.

The volume of liquid passing into line 91 during the period of the cycle of operation of unit subassembly 40 between the stages shown in FIGS. 5 and 6 is drawn from the (a) line 49 and (b) interior volume 165 of sample receiver chamber 35 and (c) the chambers 181, 179 and 177 in valve 56. This amount is reduced by any amount of leakage that occurs during any "teeter" stage when the spool 68 is in the position shown in FIG. 8C; at such position (shown in FIG. 8C) the valve orifice 192 in plate 182 is open and the bottom valve orifice 194 in bottom plate 184 is open.

As below described the amount of liquid discharged in such stage is fixed and small notwithstanding that during the portion of the cycle of operation of valve 56 wherein liquid flows from line 91 to the valve outlet 176 of the valve 56 water passes through orifice 192 to chamber 175 and partially fills the chamber 181 to the level of the orifice 192, the axis of chamber 181 of the valve 56 (as well as 256 and 456) then being horizontal, as shown in FIGS. 1 and 2. As conical point 190 is blunt and slotted, a possible "teeter" period as in FIG. 8C is extremely brief because the structure of valve 56 provides that there clearly is relief of some force of spring 152 on plate 153 and consequent relief of some force of plate 195 on the head of spool 68 prior to the valve spool point 190 being at all moved from its blocking or sealing relation to the lower valve orifice 194. Also, the spring 152 is very long (about 2 inches) relative to the total movement of valve spool 58 from position shown in FIG. 8B to that shown in FIG. 8A (about one-sixteenth inch) in the particular embodiment used and so avoids any increase in pressure required to close the valve orifice 192 once plate 195 begins to reduce its force of contact with the head of spool 68.

Also, the interchamber orifice 160 between chambers 177 and 181 is a circular segment (portion of a circle bounded by an arc and its chord) with a length (along chord) of one-half inch and a width (from chord to arc) indicated as 161 in FIG. 8B of three-sixteenth inch, while orifice 192 is only three-sixteenth inch diameter. Accordingly, liquid flows more readily from orifice 180 of valve 56 to and through such orifice 160 than through the smaller sealing orifice 192 and such liquid develops no substantial pressure against the orifice 192 during initial period of flow from orifice 180 to 160.

The valve 56 also provides a large increment of movement of spool 68 during the period of a small increase in pressure in line 85 (connected to orifice 174 of valve 56) because of the exposure of the face of the point 190 to the fluid under pressure from line 49 at the time that the orifice 194 closing action of spring 153 is overcome by the gas pressure in line 85 whereby the force with which the spool is urged towards orifice 192 is increased by the added area at the blunt spool point across which such liquid pressure is applied while the bulky helical spring 153 in combination with the bulky shaft 189 blocks initial direct flow of liquid from orifice 184 to 192.

The time for the short movement of the spool shoulder 188 to make a sealing contact with orifice 192 is brief, no more than about one-fifth second, and other forces creating such movement; e.g. pressure of water in line 49, pressure of gas in line 85 are constant; e.g. the volume of liquid entering chamber 181 prior to closing of the orifice 192 by the shoulder 188 is limited by the size of orifice 194 and pressure in line 49 and size of chamber 181; the orifice sizes and chamber size are fixed by the structure of the valve 56: the pressure on the liquid in line 49 is determined by the pressure of the gas 168 in chamber 165 which gas pressure is fixed by the constant output pressure valve 25. The movement of spool 68 is a rapid "snap" action while the liquid flowing through the orifice channel 159 of orifice unit 50 is throttled and accordingly flows through such orifice channel at an even rate of flow to and thence through orifices 180 and 184 of valve 65 slowly to orifice 192.

Accordingly, as the period of time during which both orifices 192 and 194 are open is short and the same in each cycle, only the same amount (about 0.2 grams) of liquid is discharged from valve 56 during each such step of transferring liquid from chamber 35 and line 49 to chamber 92 and line 91. As line 91 is a dimensionally stable hose (1500 p.s.i. test, wire braid reinforced) and the liquid in that hose fills that hose at all times only a fixed and predetermined volume of liquid passes out of chamber 35 during each cycle of operation to chamber 92 and 94, line 91, valve chamber 177 and to the theretofore unfilled portion of valve chamber 181, as well as to provide discharges of small yet fixed amount from outlets of valves 94 and 56.

After the accumulator chamber 81 is filled with gas at a pressure sufficiently raised to effect the movement of spool 28 of valve 26 from its position shown in FIG. 4 (and in FIG. 8B for the like spool 58) to the position of the spool 28 shown in FIG. 5 (and in FIG. 8A for the like spool 58), the resulting movement of the valve spool 28 serves to connect orifices 178.2 and 180.2 of valve 26 in manner shown for connection of orifices 178 and 180 in FIG. 8A. Conduit 63 is thereby then connected to the line 31 and passes gas from line 22 under the constant pressure as provided for by the constant output pressure valve 25 (or of the line 22 if there is no such constant pressure output valve) through the quick disconnect coupling 32 thence through cut-off valve 34 to the sample container 35 chamber 165.

The pressurized, gas passing into line 41 from valve 26 occupies the volume of the liquid in chamber 165 theretofore passed from that chamber into line 49 and 91, valve 56 and to displacement control subassembly 90. The displacement control subassembly 90, once filled with a predetermined amount of incompressible liquid, prevents further entry of gas into chamber 165, and the pressure in chamber 35 rises and reaches that of the constant output pressure valve 25, leaving a gas sample in chamber 165.

Figure 7:
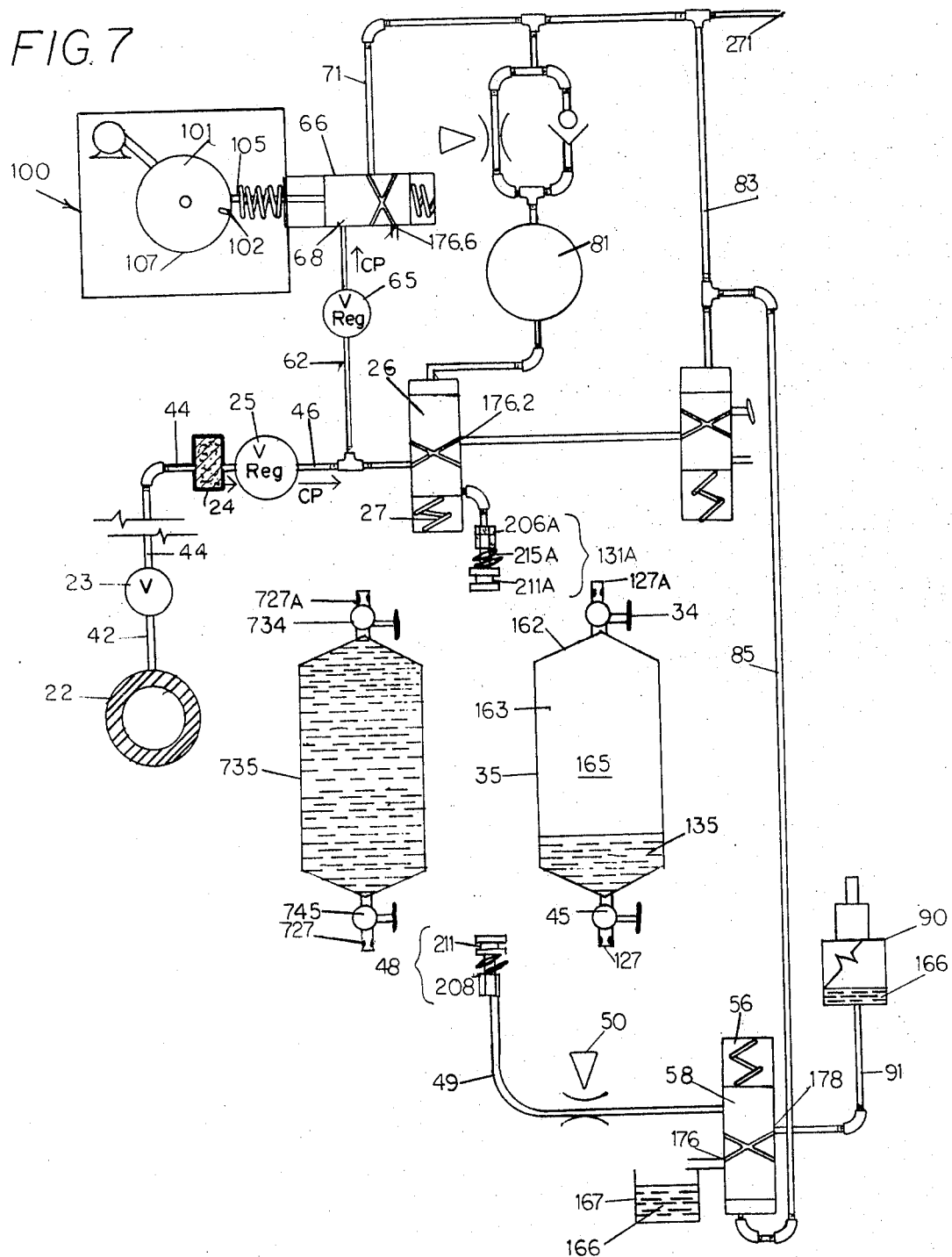

When the period of sampling is over the valve control wheel 101 moves from the position thereof shown in FIGS. 5 and 6 to the position thereof shown in FIG. 7. In this position the spool 68 of the valve 66 is moved leftward from the position shown in FIGS. 4 and 5 to the position shown in FIG. 7. In this position the spool 68 is moved to the position whereat orifices 176.6 and 178.6 communicate with line 71 and accordingly exhausts such line. The exhaustion of such line provides for the release of pressure against the valve control 37 and the movement thereof from the position shown in FIGS. 5 and 6 to the position shown in FIG. 7 in which position no further gas or fluid passage occurs through the line 64. Concurrently, there is flow from the accumulator 81, which is under pressure, to and through the check valve 78 and then to and through the line 73, tee 72 and line 71 likewise to exhaust through the valve 66. This exhaust of gas under pressure from the accumulator 81 causes the valve control unit 27 of the receiver valve 26 to return from the position shown in FIG. 6 to the position thereof shown in FIGS. 4 & 7. This return is accomplished by the conventional spring loading (as 152 in valve 56) of the valve control unit 27. This movement of the control unit 27 moves the spool 28 so that the line 63 no longer connects to the line 31 and further flow from the line 22 to the chamber 35 is terminated. At the same time the spool 28 of the valve 26 is connected to the line 64 for a subsequent purging step in a subsequent sampling cycle.

Concurrent with the movement of the valve spool 28 to the position shown in FIG. 7 the pressure in line 85 to control unit 57 of the valve 56 also bleeds through to the line 71 to exhaust and valve body 58 is moved from the position shown in FIG. 5 to the position thereof shown in FIGS. 4 and 7.

In the position of the valve body 58 shown in FIG. 7 the body of liquid 166 in chamber 92 escapes through line 91 and the valve 56 to a metering liquid holder 167. This passage of the metering liquid provides that the cap 95 sinks to the bottom of the chamber 125 therefor and air passes through the opening 97 in the roof of the chamber 125 and holes 112, 112', 112'' of cap 94.

The volume of chamber 92, line 91 and some passages of valve 56 are accordingly thus filled with air in the position of parts shown in FIGS. 4 and 7. However, in the position of FIGS. 5 and 6 a portion of the metering liquid 135 discharges into that volume, displacing the air theretofore occupying such volume and providing a discharge at valves 94 and 56. The volume of this portion of the discharged metering liquid is a highly accurately reproduceable volume and provides for a highly reproduceable displacement volume so that the amount of gas taken in at each increment of sampling is identical to the volume taken in at any other increment of sampling. The pressure of each such increment is likewise the same during any increment of sampling and the temperature of the gas is recorded so that appropriate corrections may be taken for such variation as may be the result of any temperature variation.

The base 206A of the lock body 131A of quick disconnect valve 32 is the same structure as base 206 of lock body 131 of quick disconnect valve 48. The shoulder of base 206A of locking body 131A is firmly attached to the bottom of conduit line 31. The end of plug 127A distant from its free annular shoulder 130A is firmly attached to the top of upper cut-off valve 34 of the sample receiver assembly 35.

End plug 127A is operatively connected to lock body 131A of valve 32 in the same manner as end plug 127 and lock body 131 of valve 48 are connected as above described and shown in FIG. 15 during the above described operation of unit 40 of apparatus 21.

After one or several cycles of operation of the unit assembly 40 as above described in relation to FIGS. 1–11 and a corresponding passage of one or several increments of gas into the interior 165 of chamber 35 and passage of corresponding amount of liquid 135 out of the interior of the chamber 35 cut-off valves 34 and 45 are closed tightly and the lock sleeve 211 of lock body 131 of quick release valve 48 is moved toward the base 206 to release the end plug 127 from the lock body 131 as above described in relation to FIGS. 12–15. Immediately thereafter the lock body and the upper end of the flexible hose line 49 attached to that lock body are carefully moved downwardly from the end plug 127, the upper end of which is firmly attached to the lower end of cut-off valve 45 (which is firmly attached to chamber 35).

The valve spool 196 then automatically and immediately seals off the orifice 191 in plate 139 of sleeve 132 and maintains in line 49 and valve 56 and in chamber 150 above shoulder 139 the displacement liquid; e.g. water-theretofore completely filling that line to the inlet of valve 56 and the chamber 175 in the valve 56. The flexibility of line 49 permits this release of the valve 48. The structure of valve 48 provides for maintaining the liquid between volume chamber 165 and locking or sealing shoulder 188 of spool 68 of valve 65 available for the next cycle of operations using another sample receiver assembly as 35. After such separation the lock body is maintained with its sleeve 132 and locking sleeve vertical and the pyramidal shaped valve body 196 pointed upward but moved out of alignment with longitudinal axis of chamber 165 of sample receiver 35, so that such receiver may be later moved downwards for replacement.

After the closure of valves 34 and 45 followed by disconnection of lower quick disconnect valve 48 from lower cut-off valve 45, the upper quick disconnect valve 32 is disconnected from the upper end plug 127A. This disconnection is accomplished by moving the lock body sleeve 211A against the force of spring 215A (which spring corresponds to spring 215 of quick disconnect valve 48) toward the base 206A to release the end plug 127A from the lock body 131A. Immediately thereafter the end plug 127A and the sample receiver assembly 35 to which attached are carefully moved downward from the chamber of lock body 131A (corresponding to chamber 149 of lock body 131 above shoulder 139).

The valve spool of valve 32 corresponding to spool 196 of valve 48 then immediately and automatically seals off the orifice such as 191 in plate 139 of sleeve 132 and maintains in line 31 the fluid---e.g. gas to be sampled---theretofore completely filling that line and the chamber, as 175 in valve 56, to which such line is connected. The structure of valve 32 provides for maintaining the gas (of known composition) available for the next cycle of operation using another sample receiver as 35.

Each thus separated sample receiver, as 35, is replaced by another like replacement sample receiver, as 735, wherein the interior chamber (corresponding to 165) is filled with water from and including valve 734 to and including valve 745 (corresponding to valves 34 and 45) and, also the volume of channel 128 in plug 127 of valve 48 is filled with water and the plug 127A of valve 32 is filled with water (or other displacement liquid used in 165) while the lock body 131 of valve 48 and the end of flexible hose line 49 attached thereto are moved out of the way of or out of the space theretofore occupied by sample chamber assembly 35. The lock body 131A of quick disconnect valve 32 attached to the conduit 31 is then attached to the upper end plug, as 727A of the receiver 735. Plug 727A is identical to plug 127A in structure and is attached to cut-off valve 734 as plug 127A is attached to cut-off valve 34.

The lower end plug 727 of sample receiver 735 is then attached to the lower lock body 131 of quick disconnect valve 48.

This convenient and rapid exchange of a sample receiver subassembly 735 ready to be filled with gas to be sampled for the sample receiver 35 filled as above leaves the replacement sample receiver subassembly in the identical condition as was sample receiver 35 when it was placed in operative connection in the assembly 21; the receiver assembly 735, like receiver assembly 35, comprises a standard sturdy metal gas-tight cylindrical gas cylinder tube 163 with rounded narrower upper end 162 and a like rounded narrow lower end 164 and an interior chamber 165 and an upper gas-tight cut-off valve 32 and a like lower gas-tight cut-off valve 45. An end plug 127A for a quick release valve 32 is firmly connected to the top of valve 34 and an end plug 127 for a quick release valve 48 is firmly connected to the bottom end of bottom cut-off valve 45. The chamber 165 and channels through valves 32 and 45 and plugs 127 and 127A are filled with water prior to connecting the assembly 35 to lines 49 and 31. The attachment of lock body 131A to plug 127A supports the sample receiver subassembly 35 and the end of line 49 attached thereto. Similarly the attachment of lock body 131A to plug 727A supports the replacement sample receiver subassembly 735 and the line 49 attached thereto.

The process of sampling is illustrated for gas from a natural gas line 22, line 22 passing to sample receiver 35 wherein a fixed volume of a practically or substantially imcompressible liquid---water---135 is removed prior to each communication of such gas to the sample receiver. The liquid has no absorbent capacity for the gas components being measured, or can be made so, as by acidifying where the gas has acid components, as $H_2S$, or alkalizing where alkaline components, as ammonia, are expected. Other incompressible liquids may be used; e.g. oils where no oil-soluble components are expected, low freezing liquids for gases sampled at low temperature, high boiling liquids for sampling of gases at high temperatures, as alcohol and mercury.

So long as the fluid passing into the sample chamber is unreactive with the liquid used to measure and control the displacement of the sample the fluid sampled need not be a gas. The apparatus 21 for instance would sample a stream of gasoline or oil, with the liquid 135 not passing into the chamber 93 until the orientation of parts shown in FIG. 6 and, at that time the volume of fluid flow from the line (e.g. line 222) containing such fluid would flow into the container therefor; e.g. 235, in a quantity determined by the volume of liquid 135 displaced into a valve chamber, as 179 and 181 of valve 56, a line 291 (like 91) and a chamber 290 and the differential valve therefor (identical to chamber 93 and the differential valve 94 therefor).

In operation of the apparatus 21, prior to drawing the first sample of gas through chamber 165 of receiver 35 (or 235 or 435) water (or other liquid used as the displacement liquid 135) is passed into chamber 93 from valve 94 towards line 91 and valve 56, to pass through chambers 177 and 175 and 179 in the position thereof shown in FIGS. 4 and 8A so as to fill chamber 179 to the level of orifice 192 and so insure that the volume received by line 91, valve 56 and chamber 93 and 94 from chamber 165 is the same as in succeeding sample increments passed to chamber 165.

The o-ring 116 is composed of a cylindrical length of elastically compressible solid water-insoluble rubber or plastic rod formed into a continuous ring: the ring fits snugly enough within wall 121' to support itself by its elastic fit against wall 121'. The o-ring 116 has an unrestrained outer diameter larger than the internal diameter of chamber wall 121: a vertical transverse cross section of the curved rod is longer vertically when in place below roof 122 than horizontally (as viewed in FIG. 9A). (i.e., somewhat oval rather than circular in section). When the pressure of liquid in chamber 165 (usually about 125 p.s.i.g. in the preferred embodiment) is applied against cap 95; the vertical length across the transverse section (as shown in FIG. 9A) of the rod changes shape to be horizontally wider than long (vertically): this rapid distortion rapidly extends the line of contact of o-ring 116 and face 115 centrally and, because of the obtuse angle of flat face 113 with conical face 117 as illustrated in FIG. 9A rapidly displaces centrally the portion of liquid 135 theretofore immediately central of the line of contact of o-ring 116 and conical face 115 and separates it from face 115 and 113.

In the preferred embodiment of system 20 the size of lines 22, 222 and 422 is usually 12 to 24 inches in diameter; lines 42, 44, 46, 62, 63, 71, 83, 84, 85, 89 and 91 are one-fourth inch i.d. tubing. Orifice 150 has a length of three-eighths inch and a diameter of from 0.04 to 0.06 inch.

Accumulator chamber 81 is 18 cu. in capacity; where there is a distance of 30 feet from line 22 to valve 26 of assembly 21, the adjustable orifice 77 as set for a 5 second period of operation of purge operation (as shown in FIG. 5) prior to connecting line 22 to chamber 165.

The motor 109 is a spring actuated mechanically wound clock that is wound each time the sample receiver chamber 35 is replaced. The period of operation of assembly 21 in the position of parts shown in FIG. 6 needs only be 2 to 5 seconds for the above described operation of apparatus 21 with dimensions and operating conditions as in the preferred embodiment for use with gas of analysis as in Table I and water as the liquid 135; 3 seconds is the preferred time.

In the preferred embodiment of apparatus 40 the chamber 163 in assembly 35 has a volume of 5,000 milliliters between cut-off valve 34 and valve 45 and, when filled with water weighs 30 pounds.

The volume of chamber 93 is 115 cc.

The volume in chambers 179, 181 and 177 is 7 cc. total.

The volume 124.1 in valve 94, including nipple 124.2 below shoulder 123 is 3 cc.

The pressure into valve 25 is usually 150 p.s.i.g., the output pressure at 61 is set at 125 p.s.i.g.: the pressure in line 71 is reduced to a constant 15 p.s.i.g. by valve 62.

Particular dimensions of components of a preferred embodiment of differential valve 94 are set out in Table I herebelow while the qualitative relations and features of the components of such valve and its process of operation are above described.

Table I

DIMENSIONS OF VALVE 94.

| | |
|---|---|
| Cap 95 - Weight | 1½ grams |
| Skirt 110 - Outside diameter | .3075" |
| Length, bottom to bottom of surface 111 (PLA)* | .330" |
| Thickness | .020" |
| Holes 112, 112', 112", diameter | .080" |
| Diameter of edge 117 P (NLA)* | .247" |
| Diameter of face 113 (NLA) | .16" |
| Neck 119, diameter (NLA) | .16" |
| Face 115, length along edge | .050" |
| Face 118, length along edge | .09" |
| Face 111, length along edge | .09" |
| Angle of face 115 PLA | 60° |
| Angle of face 118 PLA | 30° |
| Angle of face 111 PLA | 30° |
| Ring 116 - thickness of core PLA | .070" |
| Ring orifice diameter (unrestrained) PLA | .020" |
| Ring outside diameter (unrestrained) PLA | .034" |
| Chamber 125, height, shoulder 123 to roof 122 PLA | 9/16" |
| Inside diameter, walls 121 (NLA) | .3085" |
| Inlet 124 - length of nipple (chamber 124.1) | ⅝" |
| Outlet 95 - internal diameter (NLA) | .20" |

*PLA = Measured parallel to longitudinal axis of skirt 110
*NLA = Measured normal to longitudinal axis of skirt 100

Particular dimensions of components of a preferred embodiment of receiver control valve 56 are set out in Table II herebelow while the qualitative relations and features of the components of such valve and its process of operation are above described.

Table II

VALVE 56*, CHAMBER 181 DIMENSIONS.

| | |
|---|---|
| Chamber 181 | |
| Length, top of 184 in FIG. 14 to bottom of 182 | 1 1/16 |
| Diameter | 0.65" |
| Spring 183 | |

Table II-Continued

VALVE 56*, CHAMBER 181 DIMENSIONS.

| | |
|---|---|
| Length, top of shoulder 184 to bottom of 188 | 1" |
| Helix diameter, outside | 0.56" |
| Helix diameter, internal | .42" |
| Coil wire diameter | .07" |
| Number of full turns | 11 |
| Shaft 189 of spool 68 | |
| Diameter | 0.39" |
| Point 190, soid angle of conical point | 90° |
| Slot in point, length | 0.20" |
| Slot in point, depth | .07" |
| Slot in point, width | .03" |
| Collar 188 - diameter | 9/16" |
| Thin shaft 187 - diameter | ⅛" |
| Hole 192, diameter | 3/16" |
| Hole 184 | 3/16" |
| Hole 160, width | ½" |

*Common name - Fisher Governor Co., Marshaltown, U.S.A. Model type 164Al.

In a sample operation the gas in a line as 22 is sampled every 24 hours for a period of 7 days: each sample of 120 ml. volume at 125 p.s.i.g. is obtained with an error less than ± one-half cc. A sample analysis of such gas is set out in Table III.

In the modification shown in FIG. 16 a remotely controlled actuator 700 actuates an electrically controlled valve 706. The actuator is shown in its active position in FIG. 16.

The spool 708 (like spool 58 of valve 56) of valve 706, in its active, open, position, passes gas from line 62 to the control chamber (as 173 of valve 56) in a control valve 666. Valve 666 is identical in structure to valve 56 and operates and in the same functional relation to other components of assembly 60, 260 and 460 as provided for by valve 66. The valve chambers and orifices and spool of valve 666 is identical to valve chamber and orifice and spool 58 of valve 56 and operates as does valve 66 in the system 40 of FIGS. 4–7 and provides for similarly actuating delay timers as 76, 276 and 476 of timer control assemblies as 60, 260 and 460 and via lines, as 83, 283 and 483 purge valves and sample receiver assemblies as in subassemblies 30, 230 and 430.

Figure 17:
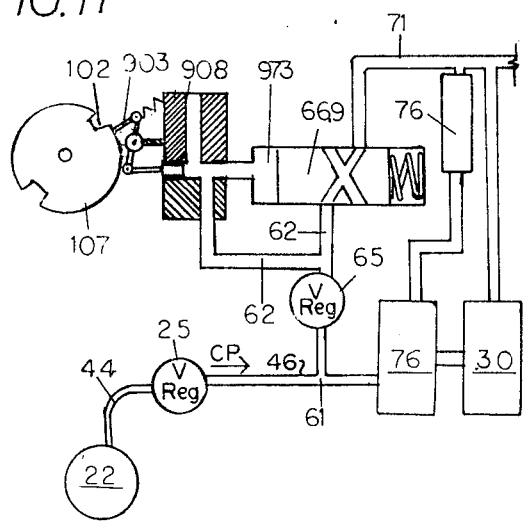
FIG. 17 illustrates the point of novelty of another modification of timer and control subassembly 60 of assembly 21.

As shown in FIG. 17 the valve 66 may be replaced by a valve 66.9 identical to valve 35 when a pin 903 actuates a valve 908 to pass actuating gas to a chamber 973 in valve 66.9 (corresponding to chamber 173 of valve 56). The pin 903 bears against the edge 107 of time wheel 101 or sets in the notch 102. The valve 906 is described in U.S. Pat. No. 2,860,660 and is solid as MICRO VALVE by Barworth Instruments, Inc., Summit, New Jersey.

Figure 18:
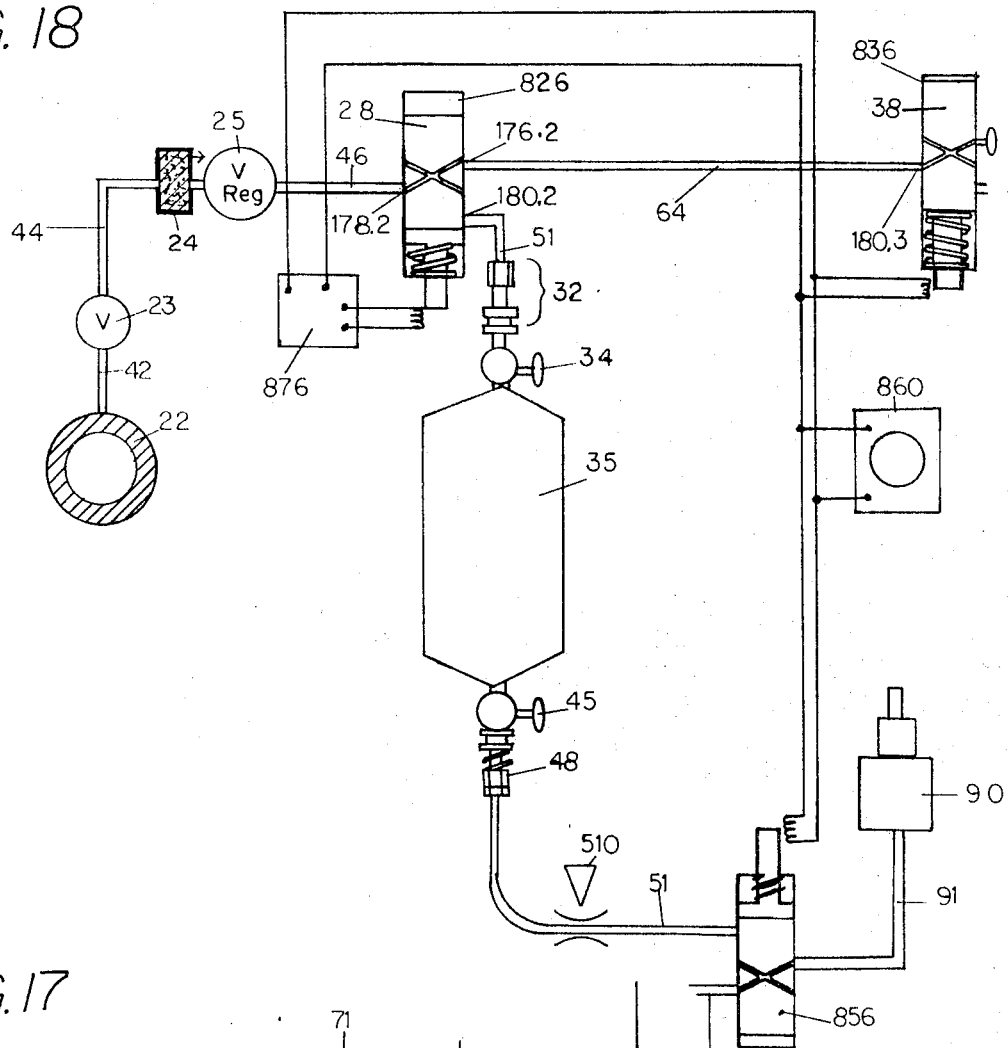
FIG. 18 illustrates a modification of unit assemby 40 of assembly 21 using electrically actuated valves to perform the sampling process of this invention.

As shown in embodiment of FIG. 18 which is a variation of assembly 21, the process timing of the valves in assembly 30 (and 260, 460, 230 and 430 may be performed by electrical time delay and electrical actuation in place of pneumatic as shown in FIGS. 1–15. In the embodiment of FIG. 17 an electrically powered and actuated electrical timer 860 actuates an electrically actuated valve 826 (wherein the hydraulic chamber 173 of valve 56 is replaced by an electrical solenoid) through a conventional time delay 866 after the purge valve 836 (similar to 826) and displacement chamber control valve 856 are actuated. The structure of valve 856 is the same as 826 above described. The structure of chamber 835 is otherwise the same 35 above discussed.

When a non-compressible fluid or liquid is sampled by apparatus 21 and an electrical system as in FIG. 18 is used, when valve spool 28 first connects orifices 178.2 and 180.2 of valve 26 or 826 in manner shown for connection of orifices 178 and 180 in FIG. 8A and conduit 63 is thereby then connected to the line 31 and passes liquid from line 22 under the constant pressure as provided for by the constant output pressure valve 25 (or of the line 22 if there is no such constant pressure output valve) through the quick disconnect coupling 32 thence through cut-off valve 34 to the sample container 35; such liquid volume as is delivered to container 35 drives the liquid 135 in the container 35 from the initial liquid level 137 for that cycle of operation shown in FIG. 5 downward to a lower level 138 shown in FIG. 6. The displaced liquid 135 then passes serially through the valve 54 and orifice 150 to the channel in valve 56 to chamber 93. When gas is sampled from line 22 such change in level occurs prior to the gas passing from valve 26 to chamber 163.

TABLE III

| Component | Percentage by Volume |
|---|---|
| CH₄ | 80–85 Range |
| C₂H₆ | 10–20 Range |
| N₂ | .5–1.5 Range |

The apparatus 21, with dimensions as herein above described holds 24 fluid samples in each of chambers 35, 235 and/or 435 for use when, as is usual, clock 109 drives timing wheel 101 to actuate timer and control subassembly 60 once every hour; such samples would be gas under pressure of gas entering chamber 35 or a liquid as above described. The liquid holder 167 receiver contains and stores the exactly dispensed amounts of liquid discharged from subassembly 90.

While in the preferred embodiment the volume of chamber 93 is about 115 cc. and the volume discharged from orifice 176 is 120 cc. ± one-fourth cc. during each cycle of illustrative operation illustrated in FIGS. 4–7, the exact volume within components of displacement control subassembly 90 and valve 56 which first receiver then contain and then discharge the fixed volume of displacement liquid 135 may be adjusted by turning the threaded fittings 96.1 and/or 98.1 on the threaded nipple 92.1 prior to forming a gas-tight fit therebetween as well as by choice of length of any conduit line 91 between valve 56 and chamber 93. Such adjustment, once fixed, does not affect the very high precision of liquid measurement obtained by the differential action of valve 94 as above described.

We claim:

1. A sampling apparatus for connection to a fluid source and comprising, in operative combination a sample receiver subassembly, a timer subassembly, and fluid flow control subassembly;
   a. the sample receiver subassembly comprising
      i. a first gas-tight rigid sample container with an opening near the bottom thereof, a lower cut-off valve at said bottom opening, and another opening to said container and another cut-off valve at said opening, and
      ii. a rigid walled second chamber extending upwardly from a third valve, an upper outlet in said chamber at the upper end thereof, a lower orifice in said second chamber at the bottom thereof, differential valve means in said upper outlet having a passage for passing gas freely therethrough but preventing free passage of liquid therethrough and movable to seal passage of liquid therepast;
b. the fluid flow control subassembly comprising,
  i. a constant output pressure output valve connected to a first conduit for connection to said fluid source,
  ii. a first valve with a first inlet connected to the output of said constant pressure valve, a first spool in said first valve and first spool positioning means in said first valve resiliently yet firmly holding said spool in a first position with the first outlet of said first valve being operatively connected to the first inlet of a second valve, and disconnected from a second outlet of said first valve, said second outlet of said first valve connected to the upper cut-off valve of said another cut-off valve of said sample receiver subassembly,
  iii. a second valve with a first inlet connected to said first outlet of said first valve, a second spool in said second valve, spool positioning means in said second valve connecting said inlet of said second valve to a blocking means,
  iv. a bottom coupling connected to said sample receiver bottom cut-off valve;
  v. a third valve with one inlet connected to said bottom coupling through a flexible constant volume conduit and an orifice therebetween and a second inlet connected to the lower orifice in said second chamber, third spool means in said third valve, third spool holding means in said third valve holding said third spool means in a first position whereat the second inlet thereof is connected to a second outlet and said second outlet is connected to the atmosphere and said second inlet and said one inlet are disconnected from each other;
c. timer means operatively connected to the spool means of said second and third valves and to a time delay means connected to said first valve means spool, said control means operative to
  i. at a first step, simultaneously move said second spool in said second valve to connect the first inlet of said second valve to the atmosphere, and move said third spool in said third valve means to a second position to connect said first inlet of said third valve and the bottom cut-off valve and the one inlet connected to the lower orifice of said second chamber and disconnect the lower orifice of said second chamber from the atmosphere, and said third spool means in said third valve blocking connection between said lower orifice of said second chamber and said atmosphere when said control means moves said third spool in said third valve to said second position to connect said lower orifice of said second chamber to said lower outlet of said first sample container, and
  ii. at a second step, through said time delay means, move said first spool in said first valve means to connect the first inlet of said first valve and the outlet of the constant pressure valve to the other cut-off valve of said sample receiver assembly.

2. Apparatus as in claim 1 wherein said lower coupling has a check valve means preventing fluid flow therethrough from and to said one inlet of said third valve on release of the connection between said flexible conduit and said bottom cut-off valve of said sample receiver.

3. Apparatus as in claim 2 wherein said upper coupling has a valve means preventing fluid flow therethrough on release of connection of said first valve second outlet and said sample receiver upper cut-off valve.

4. Apparatus as in claim 3 wherein said differential valve comprises valve chamber with a lower inlet and an upper outlet and a vertical side wall and a movable piston in said chamber, said piston having a skirt slidably fitting the chamber walls and a perforated yoke above said skirt and an imperforate plate above said yoke and attached thereto, perforations in said yoke, a valve orifice in said chamber roof, said plate being larger than said orifice and, in one, elevated, position thereof, in gas-tight sealing relation therewith, said plate edge being spaced a greater distance further from said chamber wall than said skirt and a lesser distance than the size of said perforations in said yoke.

5. A sampling apparatus for connection to a fluid source and comprising, in operative combination a plurality of sample receiver subassemblies, timer means, and fluid flow control subassemblies;
a. each sample receiver subassembly comprising
  i. a first gas-tight rigid sample container with an opening near the bottom thereof, a lower cut-off valve at said bottom opening, and another opening to said container and another cut-off valve at said opening, and
  ii. a rigid walled second chamber extending upwardly, an upper outlet in said chamber at the upper end thereof, a lower orifice in said second chamber at the bottom thereof, differential valve means in said upper outlet having a passage for passing gas freely therethrough but preventing free passage of liquid therethrough and movable to seal passage of liquid therepast;
b. each fluid flow control subassembly comprising,
  i. a constant output pressure output valve connected to a first conduit for connection to said fluid source,
  ii. a first valve with a first inlet connected to the output of said constant pressure valve, a first spool in said first valve and first spool positioning means in said first valve resiliently yet firmly holding said spool in a first position with the first outlet of said first valve being operatively connected to the first inlet of a second valve, and disconnected from a second outlet of said first valve, said second outlet of said first valve connected to the upper cut-off valve of said another cut-off valve of said sample receiver subassembly,
  iii. a second valve with a first inlet connected to said first outlet of said first valve, a second spool in said second valve spool, positioning means in said second valve holding said second spool means in a first position to connect said inlet of said second valve to a blocking means,
  iv. a bottom coupling connected to said sample receiver bottom cut-off valve;

v. a third valve with one inlet connected to said bottom coupling through a flexible constant volume conduit and an orifice therebetween and a second inlet connected to the lower orifice in said second chamber thereabove, third spool means in said third valve, third spool holding means in said third valve holding said third spool means in a first position whereat the second inlet thereof is connected to a second outlet and said second outlet is connected to the atmosphere and said second inlet and said one inlet are disconnected from each other;

c. each timer means operatively connected to the spool means of one of said second and third valves and to a time delay means connected to one of said first valve means spool, said timer means operative to i. at a first step, simultaneously move said second spool in said second valve to connect the first inlet of said second valve to the atmosphere, and move said third spool in said third valve means to a second position to connect said first inlet of said third valve and the one inlet and disconnect the lower orifice of said second chamber from the atmosphere and said third spool means in said valve blocking connection between said lower orifice of said second chamber and said atmosphere when said control means moves said third spool in said third valve to said second position to connect said lower orifice of said second chamber to said lower outlet of said sample receiver chamber, and ii. at a second step, through said time delay means, move said first spool in said first valve means to connect the first inlet of said first valve and the outlet of the constant pressure valve to the other cut-off valve of said sample receiver assembly.

6. Apparatus as in claim 5 wherein each said lower coupling has a check valve means preventing fluid flow therethrough from and to said one inlet of said third valve on release of the connection between said flexible conduit and said bottom cut-off valve of said sample receiver and wherein said upper coupling has a valve means preventing fluid flow therethrough on release of connection of said first valve second outlet and said sample receiver upper cut-off valve.

7. A liquid metering apparatus comprising, in operative combination a. a rigid walled chamber extending upwardly, an upper outlet in said chamber at the upper end thereof, a lower orifice in said second chamber at the bottom thereof, differential valve means in said upper outlet having a passage for passing gas freely therethrough but preventing free passage of water therethrough and movable to seal passage of liquid therepast;

b. a valve with one inlet connected to a coupling through a constant volume conduit and an orifice therebetween and a second inlet connected to the lower orifice in said chamber which orifice is located above said valve spool means in said valve, spool holding means in said valve holding said spool means in a first position whereat the second inlet thereof is connected to a second outlet and said second outlet is connected to the atmosphere and said second inlet and said one inlet are disconnected from each other, and c. wherein said differential valve comprises a valve chamber with a lower inlet and an upper outlet and a vertical side wall and a movable piston in said chamber, said piston having a skirt slidably fitting the chamber walls and a perforated yoke above said skirt and an imperforate plate above said yoke and attached thereto, perforations in said yoke, a valve orifice in said chamber roof, said plate being larger than said orifice and in one, elevated, position thereof, in gas-tight sealing relation therewith, said plate edge being spaced a greater distance further from said chamber wall than said skirt and a lesser distance than the size of said perforations in said yoke, whereby water forms a meniscus between the edge of said plate and said valve chamber wall and water flows freely through said perforated yoke.

8. A process of sampling a fluid stream over a period of time while continuously passing one portion of said fluid stream through a first conduit by periodically and discontinuously withdrawing samples from aid fluid stream by a series of periodically repeated like cycles of steps, each such cycle of steps being completed in a separate periodic time interval, each such periodic time interval spaced in time from another in said series of periodic time intervals and within said period of time, each of said cycles comprising the steps of a. periodically diverting a second portion of such fluid stream to a second conduit at a predetermined fixed pressure and then, for a first portion of each of said periodic time intervals, passing a first volume of said second portion of said fluid stream through said second conduit for a sufficient time to purge said second conduit of fluid therein, and b. i. passing a fixed portion of a volume of an incompressible metering liquid from a first chamber of fixed volume in contact with a first sample volume of said second portion of said fluid stream initially at said predetermined pressure through a third conduit of fixed internal diameter and length into bottom of a second upstanding chamber of fixed volume and initially containing a second gas and discharging all the said second gas and a fixed amount of said metering liquid from said second chamber and said third conduit, and thereby filling said third conduit and said second chamber with said incompressible metering liquid and thereby lowering the pressure in said first chamber to below said predetermined pressure, and, thereafter, b. ii. in a second portion of said periodic time intervals which follows said first portion of said periodic time interval discharging from said second chamber and third conduit all of the fixed volume of said second fluid theretofore therein passing a second volume of said second portion of said fluid stream into said first chamber and raising the pressure therein to said predetermined pressure and thereby in each such cycle locating in said first chamber one increment of fixed volume and pressure of said second stream of fluid.

9. Process as in claim 8 comprising the step of removing said first chamber from said second conduit and said third conduit at said predetermined pressure without loss of said increments of said second stream therefrom and operatively connecting to said second and third conduits another chamber of fixed volume filled with a second volume of said incompressible metering liquid.

10. Process as in claim 8 wherein said purging of said second conduit occurs while the pressure in said first chamber is being reduced by withdrawal of said metering liquid from the first chamber.

11. A process as in claim 9 wherein said fluid is a gas and said gas is substantially insoluble in said incompressible liquid and said first stream is free of pressure drop in the zone whereat said second portion of said fluid stream is diverted to said second conduit.

12. A process as in claim 11 wherein said gas is a hydrocarbon gas source and said incompressible liquid is water.

13. Process as in claim 12 wherein all of the steps are performed automatically at predetermined intervals.

14. Process as in claim 13 wherein said steps are initiated by remote control.

15. A process for repetitive periodic sampling of a first fluid comprising serially repeated steps of
   a. passing a portion of said first fluid from a source thereof through a conduit line leading to a first chamber having a fixed volume for a sufficient time to purge said conduit line of any fluid theretofore therein, then passing another portion of said first fluid into said first chamber, said first chamber containing a second incompressible metering liquid at a predetermined initial pressure; and
   b. opening a valve passage from said first chamber of fixed volume and passing such metering liquid through a first conduit of fixed internal diameter and length into a second upstanding chamber of fixed volume initially filled with a second fluid; and
   c. reducing the pressure in said first chamber and passing an additional sample of said first fluid from its source at said predetermined initial pressure into said first chamber and passing a fixed volume of said second incompressible metering liquid from said first chamber through said valve and first conduit and into said second chamber and thereby filling said conduit and said second chamber with said second incompressible liquid, said first fluid and said second fluid being substantially insoluble in said incompressible metering liquid; and
   d. raising the first chamber pressure to said predetermined pressure and thereby locating in said first chamber one increment of fixed volume and pressure of said first fluid; and
   e. selectively discharging from said second chamber and first conduit all of the fixed volume of said second fluid theretofore therein to a holder therefor.

16. Process as in claim 15 wherein said purging of said second conduit occurs while the pressure in said first chamber is being reduced by withdrawal of said metering liquid from the first chamber.

17. Process as in claim 16 comprising the step of removing said first chamber from said source conduit and said second conduit at said predetermined pressure without loss of said increments of said second stream therefrom and operatively connecting to said source and second conduits another chamber of fixed volume filled with a second volume of said incompressible metering liquid.

18. A process as in claim 19 wherein said first fluid is a hydrocarbon liquid and said incompressible liquid is an aqueous liquid.

19. Process as in claim 19 wherein first fluid gas is a hydrocarbon gas and said incompressible liquid is water.

* * * * *